United States Patent
Kato et al.

(10) Patent No.: US 10,193,621 B2
(45) Date of Patent: Jan. 29, 2019

(54) LOCATION MEASUREMENT APPARATUS, LIGHT MODULATION CONVERTER, AND LIGHT VARIATION LOCATION MEASUREMENT METHOD

(71) Applicant: FUJITSU LIMITED, Kawasaki-shi, Kanagawa (JP)

(72) Inventors: Tomoyuki Kato, Yokohama (JP); Shigeki Watanabe, Kawasaki (JP); Takeshi Hoshida, Kawasaki (JP); Takahito Tanimura, Yokohama (JP)

(73) Assignee: FUJITSU LIMITED, Kawasaki (JP)

(*) Notice: Subject to any disclaimer, the term of this patent is extended or adjusted under 35 U.S.C. 154(b) by 0 days.

(21) Appl. No.: 15/959,582

(22) Filed: Apr. 23, 2018

(65) Prior Publication Data
US 2018/0316422 A1 Nov. 1, 2018

(30) Foreign Application Priority Data
Apr. 27, 2017 (JP) .................................. 2017-088916

(51) Int. Cl.
*H04B 10/071* (2013.01)
*H04B 10/079* (2013.01)
*G01M 11/00* (2006.01)

(52) U.S. Cl.
CPC ..... *H04B 10/0791* (2013.01); *G01M 11/3136* (2013.01); *G01M 11/3181* (2013.01); *H04B 10/071* (2013.01)

(58) Field of Classification Search
CPC .. H04B 10/0791; H04B 10/071; H04B 10/00; H04B 10/0771; H04B 2210/078; H04B 10/032; G01M 11/3136; G01M 11/3181
See application file for complete search history.

(56) References Cited

U.S. PATENT DOCUMENTS

| 2002/0024290 A1* | 2/2002 | Uemura | B82Y 10/00 313/477 R |
| 2003/0231888 A1* | 12/2003 | Takashina | H04B 10/071 398/149 |
| 2005/0259241 A1* | 11/2005 | Tanigawa | G01M 11/3181 356/73.1 |

FOREIGN PATENT DOCUMENTS

| JP | 08-136607 | 5/1996 |
| JP | 10-148654 | 6/1998 |

* cited by examiner

*Primary Examiner* — Ted Wang
(74) *Attorney, Agent, or Firm* — Fujitsu Patent Center

(57) ABSTRACT

An apparatus includes a light source that causes continuous oscillation light to enter one terminal of an optical transmission line, wherein the continuous oscillation light is to propagate a light variation of a first physical amount generated on the optical transmission line to another terminal of the optical transmission line; a photodetector that detects, on the one terminal, light turned back from a light modulation converter provided on the another terminal, wherein the light modulation converter obtains the turned-back light by converting the light variation of the first physical amount into a light variation of a second physical amount; and a processor that calculates a light-variation location generated on the optical transmission line by comparing time variations in the light variation of the first physical amount and the light variation of the second physical amount in the light detected by the photodetector.

19 Claims, 26 Drawing Sheets

LOCATION MEASUREMENT APPARATUS, LIGHT MODULATION CONVERTER, AND LIGHT VARIATION LOCATION MEASUREMENT METHOD

CROSS-REFERENCE TO RELATED APPLICATION

This application is based upon and claims the benefit of priority of the prior Japanese Patent Application No. 2017-88916, filed on Apr. 27, 2017, the entire contents of which are incorporated herein by reference.

FIELD

The embodiments discussed herein are related to a measurement apparatus and a measurement method that measure a light variation location generated on a transmission line of an optical fiber, and a light modulation converter.

BACKGROUND

An abrupt light variation generated during the transmission degrades the reception sensitivity and causes a communication error. To address this, it is desirable to identify a location where the light variation is generated and to cope with the problem. For example, the use of an optical time domain reflectometer (OTDR) enables measurement of a loss generation location of an optical fiber. However, the OTDR is unable to identify a location of an instantaneous variation or a light variation without a loss.

Meanwhile, there is a technique of: inputting light from one terminal of an optical fiber; turning the light back at the other terminal of the optical fiber; monitoring a state of the output light at the one terminal side; and thereby identifying a light variation location from a time difference a light variation generated in the outward path and a light variation generated in the return path (for example, see Japanese Laid-open Patent Publication Nos. 08-136607 and 10-148654).

However, the measurement of a light variation location is impossible unless the light variation generated in the optical fiber of the outward path and the light variation generated in the optical fiber of the return path may be time-resolved. When the light variation generated in the outward path and the light variation generated in the return path are overlapped with each other, the measurement of the light variation locations is failed due to a difficulty in resolving the light variations in the outward path and the return path.

SUMMARY

According to an aspect of the embodiments, a location-measurement apparatus that is disposed on one terminal of an optical transmission line, includes: a light source that causes continuous oscillation light to enter one terminal of the optical transmission line, the continuous oscillation light being to propagate a light variation of a first physical amount generated on the optical transmission line to another terminal of the optical transmission line; a photodetector that detects, on the one terminal of the optical transmission line, light turned back from a light modulation converter provided on the another terminal of the optical transmission line, wherein the light modulation converter obtains the turned-back light by converting the light variation of the first physical amount into a light variation of a second physical amount; and a processor that calculates a light-variation location generated on the optical transmission line by comparing time variations in the light variation of the first physical amount and the light variation of the second physical amount in the light detected by the photodetector.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

First Embodiment

Figure 1:
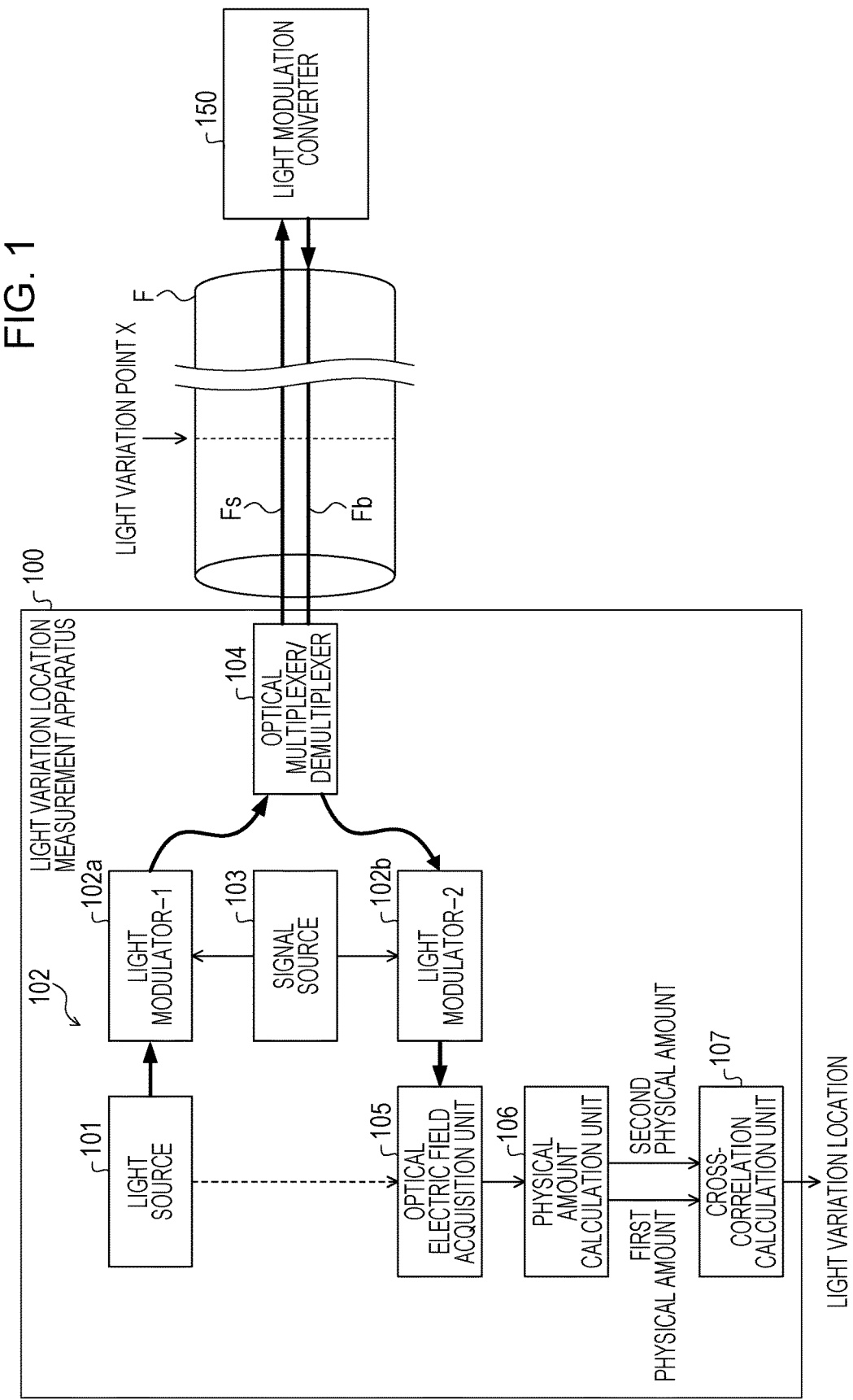
FIG. 1 is a diagram illustrating an entire configuration example including a location-measurement apparatus according to a first embodiment.

FIG. 1 is a diagram illustrating an entire configuration example including a location-measurement apparatus according to a first embodiment. The entire configuration of light variation location measurement in embodiments discussed herein is explained using FIG. 1. A system of the light variation location measurement includes a location-measurement apparatus 100 that is provided on one terminal side of an optical cable (optical transmission line) F, and a light modulation converter 150 that is provided on the other terminal side of the optical cable F.

The location-measurement apparatus 100 causes light to input from one terminal of the optical cable F into an optical fiber (core) Fs of an outward path. The light modulation converter 150 is coupled to the other terminal of the optical fiber Fs. The light modulation converter 150 converts a light variation of a physical amount in the outward path into a light variation of a different physical amount.

The light after the conversion by the light modulation converter 150 is inputted into an optical fiber (core) Fb of a return path in the optical cable F, so that the light in the outward path is turned back as light in the return path. The light is outputted from the optical fiber Fb of the return path to the location-measurement apparatus 100 on one terminal side of the optical cable F.

Herein, as illustrated in FIG. 1, it is assumed that a light variation is generated due to some sort of cause at a light variation point X, in the configuration of the optical cable F containing the optical fiber Fs of the outward path and the optical fiber Fb of the return path.

The location-measurement apparatus 100 compares the light variation of a physical amount in the optical fiber Fs of the outward path with the light variation of another physical amount in the optical fiber Fb of the return path through which the light is received. This allows the location-measurement apparatus 100 to measure a light variation location even if light variations in the outward path and in the return path (the optical fibers Fs and Fb) of the optical cable F are temporally overlapped with each other.

The optical fibers Fs and Fb in the outward path and in the return path may have different cores, and the optical cable F containing the cores of the outward path and the return path may be used as illustrated in FIG. 1, or different optical cables for the respective cores may be used. The type of the optical fiber is not limited to a single-mode fiber, but the embodiments are applicable to a multi-core fiber and a multi-mode fiber.

The location-measurement apparatus 100 includes a light source 101, a light modulator 102, a signal source 103, an optical multiplexer/demultiplexer 104, an optical electric field acquisition unit 105, a physical amount calculation unit 106, and a cross-correlation calculation unit 107.

The light source 101 outputs continuous light having a predetermined wavelength (first wavelength $\lambda 1$). The light modulator 102 includes a first light modulator (light modulator-1) 102a and a second light modulator (light modulator-2) 102b. The first light modulator 102a performs light modulation corresponding to a physical amount (first physical amount) used for detection of a light variation location with respect to the optical fiber Fs of the outward path, using signals from the signal source 103. The second light modulator 102b performs light modulation corresponding to a physical amount (second physical amount) used for detection of a light variation location of light that is transmitted and received through the optical fiber Fb of the return path, using signals from the signal source 103.

The optical multiplexer/demultiplexer 104 causes the light to be incident in the optical fiber Fs of the outward path in the optical cable F, and takes out the light from the optical fiber Fb of the return path. As for the optical multiplexer/demultiplexer 104, for example, an optical splitter, a wavelength multiplexer/demultiplexer, or an optical circulator may be used.

The optical electric field acquisition unit 105 includes a photodetector (PD, light receiver), an AD converter (ADC), and the like, and acquires by calculation an optical electric field amount of light that is received from the optical fiber Fb of the return path. The physical amount calculation unit 106 obtains by calculation, based on the optical electric field amount acquired by the optical electric field acquisition unit 105, a physical amount (first physical amount) in the optical fiber Fs of the outward path and a physical amount (second physical amount) in the optical fiber Fb of the return path.

The cross-correlation calculation unit 107 obtains by calculation a correlation between the physical amount in the optical fiber Fs of the outward path and the physical amount in the optical fiber Fb of the return path, and outputs a light variation location based on the correlation. The light variation location includes a light variation location on the optical fiber Fs of the outward path and a light variation location on the optical fiber Fb of the return path.

Herein, the overview of the location-measurement apparatus 100 that deals with various kinds of light variations and configuration examples related to the light of the light modulation converter 150 is explained. Details of application examples 1. to 5. for various kinds of light variations described below are explained in details in embodiments described later.

Note that, the light modulator 102 of the location-measurement apparatus 100 has such a configuration that a light variation or the like indicating a pilot signal (distance measurement reference, in other words, a distance of one terminal of the optical cable F=0), which is described later, is added to the light from the light source 101. The pilot signal includes any one of light variation components of the light intensity, the phase, the polarization, and the frequency, which corresponds to each of the application examples 1. to 5., by the light modulator 102. Moreover, providing the light modulator 102 may stabilize an optical signal. Note that, may be used such a configuration that the light from the light source 101 is directly inputted into the optical fiber Fs of the outward path and the light modulator 102 is not provided. Also at the light modulation converter 150 side, providing the light modulator 102 similarly allows a pilot signal (a distance indicating the other terminal of the optical cable F=L) to be added.

1. Dealing with Polarization Variation

The light source 101 of the location-measurement apparatus 100 outputs continuous oscillation light of single polarization. The light modulation converter 150 is configured to include a polarizer that converts the polarization variation into the light intensity variation, an optical multiplexer/demultiplexer, a light modulator, and the like. The polarization variation is generated due to such a factor, for example, a vibration by the optical cable F with respect to a light variation point or a variation in the electromagnetic field or the like.

2. Dealing with Light Intensity Variation

The light source 101 of the location-measurement apparatus 100 outputs continuous oscillation light having a wavelength $\lambda 1$. The light modulation converter 150 is configured to include a nonlinear optical medium that converts the light intensity variation into the phase variation, a light source of light having a wavelength $\lambda 2$, an optical multiplexer, an optical filter that allows the light having the wavelength $\lambda 2$ to pass therethrough, and the like. The light modulation converter 150 may further include a light modulator. The light intensity variation is generated due to such a factor, for example, a crosstalk between multi-cores (between the optical fibers Fs and Fb) at a light variation point of the optical cable F or a crosstalk between modes of a multi-mode fiber.

3. Dealing with Polarization Dependent Losses (PDL) Variation

The light source 101 (the first light modulator 102*a*) of the location-measurement apparatus 100 polarization-multiplexes continuous oscillation light of horizontally-polarized wave H with a wavelength $\lambda 1$ and continuous oscillation light of vertically-polarized wave V with the wavelength $\lambda 1$ to be outputted. The light modulation converter 150 is configured to include a polarized beam splitter, nonlinear optical media that convert the light intensity variations of the horizontally-polarized wave H and the vertically-polarized wave V into phase variations thereof, respectively, a light source of light having a wavelength $\lambda 2$, an optical filter that allows the light having the wavelength $\lambda 2$ to pass therethrough, a polarized beam combiner, and the like. The light modulation converter 150 may further include a light modulator. The PDL variation is generated due to such a factor, for example, a crosstalk between multi-cores (between the optical fibers Fs and Fb) at a light variation point of the optical cable F or a crosstalk between modes of a multi-mode fiber.

4. Dealing with Polarization Mode Dispersion (PMD) Variation

The light source 101 (the first light modulator 102*a*) of the location-measurement apparatus 100 polarization-multiplexes continuous oscillation light of the horizontally-polarized wave H having a wavelength $\lambda 1$ and continuous oscillation light having a wavelength $\lambda 2$ and being the vertically-polarized wave V to be outputted. The light modulation converter 150 includes a wavelength demultiplexer, polarizers respectively provided for the horizontally-polarized wave H and the vertically-polarized wave V, a wavelength multiplexer, and the like. The light modulation converter 150 may further include a light modulator.

5. Dealing with Frequency Variation

The light source 101 (the first light modulator 102*a*) of the location-measurement apparatus 100 outputs continuous oscillation light having a single wavelength $\lambda 1$. The light modulation converter 150 includes an optical filter or the like that allows only the light having the wavelength $\lambda 1$ to pass therethrough. The light modulation converter 150 may further include a light modulator.

Figure 2:
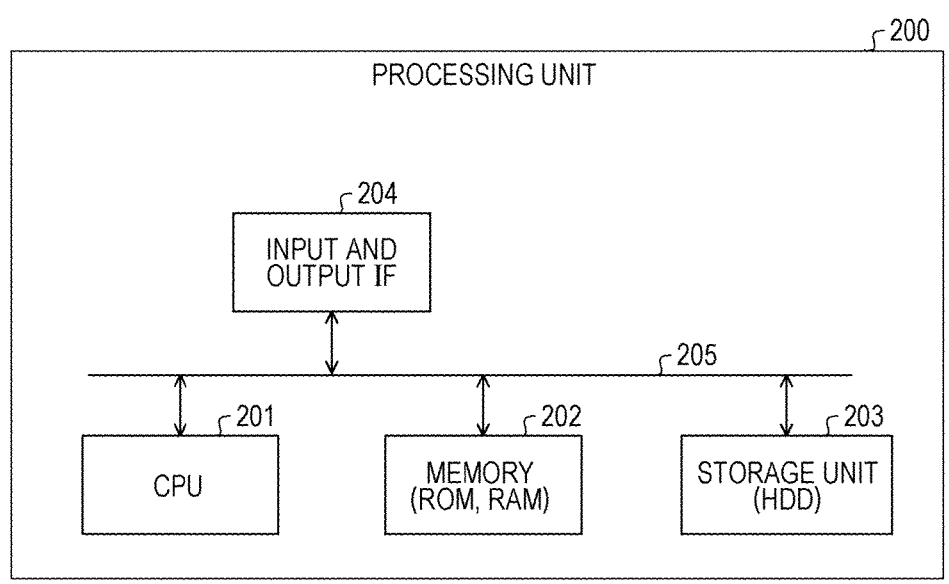
FIG. 2 is a diagram illustrating a hardware configuration example of a processing unit of the location-measurement apparatus according to the first embodiment.

FIG. 2 is a diagram illustrating a hardware configuration example of a processing unit of the location-measurement apparatus according to the first embodiment. A processing unit 200 includes a CPU (processor) 201, a memory 202 such as a ROM or a RAM, a storage unit 203 such as an HDD or a flash memory, and an input and output interface (IF) 204. A bus that couples the units to each other is denoted by 205.

The functions of a signal (data) process performed by the optical electric field acquisition unit 105, the physical amount calculation unit 106, and the cross-correlation calculation unit 107 illustrated in FIG. 1 may be implemented such that the CPU 201 in FIG. 2 executes a control program stored in the memory 202, and uses a part of the memory 202 as a work region. Moreover, the CPU 201 uses the storage unit 203 as an expansion region or a backup region of the memory 202. The input and output interface (IF) 204 receives an input of data including the first and the second physical amounts received in the optical fiber Fb of the return path and outputted by the second light modulator 102*b*. Moreover, the input and output interface (IF) 204 outputs data of the light variation location after the CPU 201 has processed data.

Note that, on a data input side (for example, output to the second light modulator 102*b*) to the CPU 201, an AD converter is provided and performs analog-digital conversion, thereby taking in data. Moreover, on a data output side from the CPU 201, a DA converter may be provided so as to correspond to an input format of data to be outputted, as appropriate.

Figure 3:
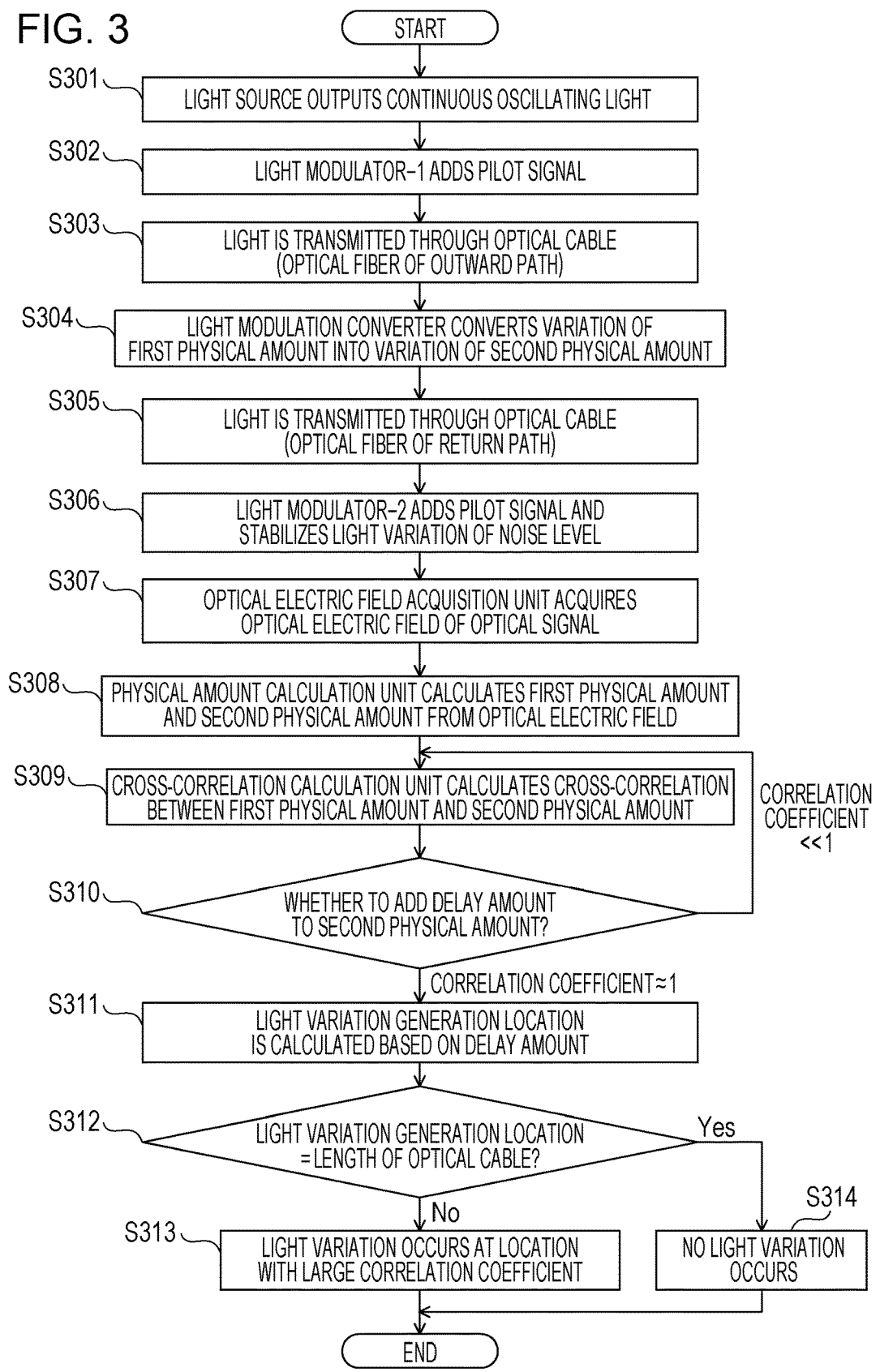
FIG. 3 is a flowchart illustrating an operation example of a system including the location-measurement apparatus according to the first embodiment.

FIG. 3 is a flowchart illustrating an operation example of a system including the location-measurement apparatus according to the first embodiment. FIG. 3 illustrates operation examples respectively performed by the location-measurement apparatus 100 and the light modulation converter 150, which are illustrated in FIG. 1.

Firstly, the location-measurement apparatus 100 outputs continuous oscillation light from the light source 101 (Step S301). The location-measurement apparatus 100 then adds, by the first light modulator (light modulator-1) 102*a*, a pilot signal of a light variation indicating one terminal of the optical cable F (distance=0) that is a measurement reference to the emitted light from the light source 101 (Step S302). This allows the light outputted from the location-measurement apparatus 100 to be transmitted through the optical cable F (the optical fiber Fs of the outward path) (Step S303).

The light modulation converter 150 converts a variation of a first physical amount of the light when being transmitted through the optical fiber Fs of the outward path into a variation of a second physical amount (Step S304). When a light modulator (a third light modulator 102*c*, which is described later) is provided in the light modulation converter 150, the light modulator adds a pilot signal of a light variation indicating the other terminal of the optical cable F (distance=L), and performs control to stabilize the light variation in the noise level of the received light. The light after the conversion outputted by the light modulation converter 150 is transmitted through the optical cable F (the optical fiber Fb of the return path) (Step S305).

The location-measurement apparatus 100 then performs, by the second light modulator (light modulator-2) 102*b*, control to stabilize the light variation in the noise level of the light received through the optical cable F (the optical fiber Fb of the return path) (Step S306).

The location-measurement apparatus 100 then acquires, by the optical electric field acquisition unit 105 (the CPU 201), an optical electric field included in the received light (Step S307). The location-measurement apparatus 100 then obtains by calculation, by the physical amount calculation unit 106 (the CPU 201), a first physical amount and a second physical amount from the optical electric field (Step S308).

The location-measurement apparatus 100 then calculates, by the cross-correlation calculation unit 107 (the CPU 201), a cross-correlation between the first physical amount and the second physical amount (Step S309). The cross-correlation calculation unit 107 herein determines whether a predetermined delay amount is added to the second physical amount in association with a difference in propagation time between the first physical amount and the second physical amount (Step S310). If the cross-correlation calculation unit 107 determines that the correlation of the second physical amount relative to the first physical amount is small (correlation coefficient<<1), the cross-correlation calculation unit 107 adds the predetermined delay amount to the second physical amount, and repeats the process to return to Step S309. In contrast, if the cross-correlation calculation unit 107 determines that the correlation is large (correlation coefficient≈1), the cross-correlation calculation unit 107 calculates a light variation generation location based on the added delay amount (Step S311).

Thereafter, the cross-correlation calculation unit 107 of the location-measurement apparatus 100 determines whether the light variation generation location=the length of the optical cable F is stablished (Step S312). If the light variation generation location is equivalent to the length of the optical cable F (distance L) (Step S312: Yes), which indicates that the light variation is caused by the pilot signal and the light variation to the entire optical cable F has been searched, the cross-correlation calculation unit 107 determines that "no light variation" occurs in the optical cable F (Step S314). If the light variation generation location is not equivalent to the length of the optical cable F (Step S312: No), the cross-correlation calculation unit 107 determines that "a light variation is generated at a location with a large correlation coefficient" within the optical cable F (Step S313). As in the foregoing, a series of measurement processes of a light variation location finished.

Note that, in the process at Step S312, it is assumed that the cross-correlation calculation unit 107 inputs the same pilot signal to the first light modulator (light modulator-1) 102*a* and the second light modulator (light modulator-2) 102*b*. In this case, the correlation coefficient becomes 1 with the delay amount corresponding to the length of the optical cable F, so that the cross-correlation calculation unit 107 determines that the light variation location indicates the one terminal of the optical cable F (distance=0).

With the first embodiment explained above, a light variation location on the outward path of the optical fiber and a light variation location on the return path of the optical fiber are measured by using different physical amounts. With this, different physical amounts in the outward path and in the return path are used for measurement of light variations, so that even when light variation locations are overlapped with each other in the outward path and in the return path, it is possible to measure both the light variation location on the outward path and the light variation location on the return path.

As for a light variation location, light corresponding to the first physical amount is inputted from one terminal of the optical fiber, and the first physical amount is converted into the second physical amount by the light modulation converter that is provided on the other terminal of the optical fiber, so that it is possible to measure a light variation location generated on the optical fiber. Moreover, it is possible to easily measure the light variation locations on one terminal side of the optical fiber, with the simple configuration.

Hereinafter, the configuration examples 1. to 5. dealing with the light variations described above are described in details using the embodiments.

Second Embodiment

Figure 4:
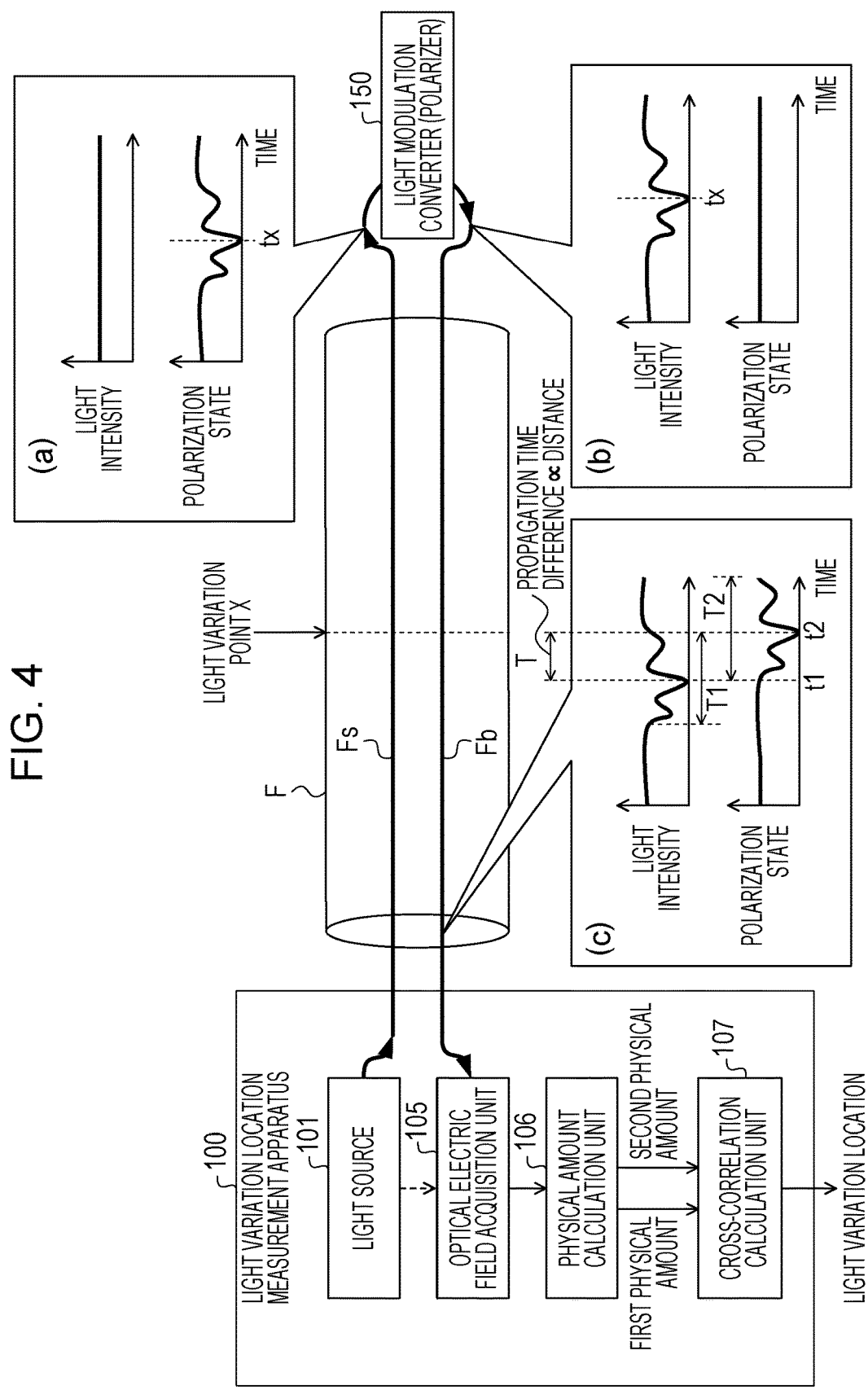
FIG. 4 is a diagram illustrating an entire configuration example including a location-measurement apparatus according to a second embodiment.

FIG. 4 is a diagram illustrating an entire configuration example including a location-measurement apparatus according to a second embodiment. In FIG. 4, the same reference numerals are given to the same constituent units as the first embodiment (FIG. 1), and the inner structure of the location-measurement apparatus 100 is partially omitted.

The second embodiment is a configuration example dealing with 1. polarization variation described above, in which the light modulation converter 150 converts a polarization variation generated at the light variation point X on the optical fiber Fs of the outward path of the optical cable F into a light intensity variation. The location-measurement apparatus 100 receives the light intensity variation for the outward path included in the light that returns via the optical fiber Fb of the return path, and the polarization variation generated at the light variation point X on the optical fiber Fb of the return path. The light source 101 outputs continuous oscillation light (predetermined wavelength λ1) of a single polarized wave.

Figure 5:
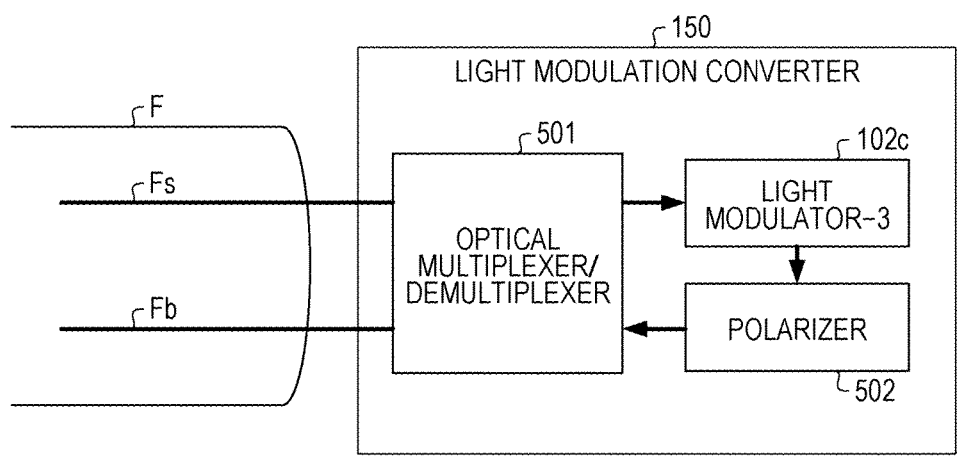
FIG. 5 is a diagram illustrating a configuration example of a light modulation converter according to the second embodiment.

FIG. 5 is a diagram illustrating a configuration example of a light modulation converter according to the second embodiment. The light modulation converter 150 may be configured using a polarizer. In addition, as illustrated in FIG. 5, the light modulation converter 150 may also be configured to include an optical multiplexer/demultiplexer 501 that is coupled to the optical fiber Fs of the outward path and the optical fiber Fb of the return path, and the third light modulator (light modulator-3) 102*c*, and a polarizer 502.

The light that is transmitted through the optical fiber Fs of the outward path is demultiplexed by the optical multiplexer/demultiplexer 501, and inputted into the third light modulator 102*c*. The third light modulator 102*c* adds a pilot signal to the light, and performs control to stabilize a light variation in the noise level of the received light in the outward path. The polarizer 502 converts the polarization variation of the light into a light intensity variation. The converted light is inputted into the optical fiber Fb of the return path.

Referring back to FIG. 4, it is assumed that a light variation is generated at the light variation point X on the optical cable F. Part (a) of FIG. 4 is a diagram indicating a state of the physical amount inputted into the light modulation converter 150 on the other terminal of the optical cable F. The longitudinal axis represents the light intensity and the polarization state (changing amount of polarization), and the horizontal axis represents the time. A polarization variation is generated (peak tx) by being corresponded to the timing when the light variation is generated at the light variation point X.

Part (b) of FIG. 4 is a diagram indicating a state of the physical amount outputted by the light modulation converter 150 on the other terminal of the optical cable F. The light modulation converter 150 converts the polarization variation into the light intensity variation, and the light intensity varies (peak tx) by being corresponded to the timing when the light variation is generated at the light variation point X.

Part (c) of FIG. 4 is a diagram indicating a state of the physical amount included in the optical fiber Fb of the return path that is inputted into the location-measurement apparatus 100 on one terminal of the optical cable F. The light intensity variation and the polarization variation of the light as the physical amounts are inputted into the location-measurement apparatus 100. Herein, the light propagation in the optical fiber Fs of the outward path and the light propagation in the optical fiber Fb of the return path have a propagation time difference T that corresponds to the time (distance) for which the light is turned back through the optical fibers Fs and Fb.

The light intensity variation timing (peak) is t1 and the light intensity variation period is T1, which are corresponded to the light variation point X. The polarization variation timing (peak) is t2 and the polarization variation period is T2, which are corresponded to the light variation point X.

As illustrated in part (c) of FIG. 4, even when the light intensity variation period T1 and the polarization variation period T2 are overlapped with each other, the location-measurement apparatus 100 uses the light intensity variation and the polarization variation that are different physical amounts, and thus is able to measure the light variation locations based on these different physical amounts. Herein, the location-measurement apparatus 100 is also able to measure light variation locations even if the period (T1+T2) during when the light variation is generated is larger than a distance resolution that the location-measurement apparatus 100 (the processing unit 200) has.

As explained above, the light modulation converter converts the polarization variation generated in the optical fiber Fs of the outward path into a light intensity variation, and the location-measurement apparatus receives a polarization variation in the optical fiber Fb of the return path as a polarization variation without any change. Further, the location-measurement apparatus receives the light including these different light intensity variation and polarization variation to obtain light variation locations. This allows the location-measurement apparatus to resolve the polarization variations in the outward path and the return path being temporally overlapped with each other (corresponding to T1+T2 in the above), and to measure the light variation locations.

Third Embodiment

Figure 6:
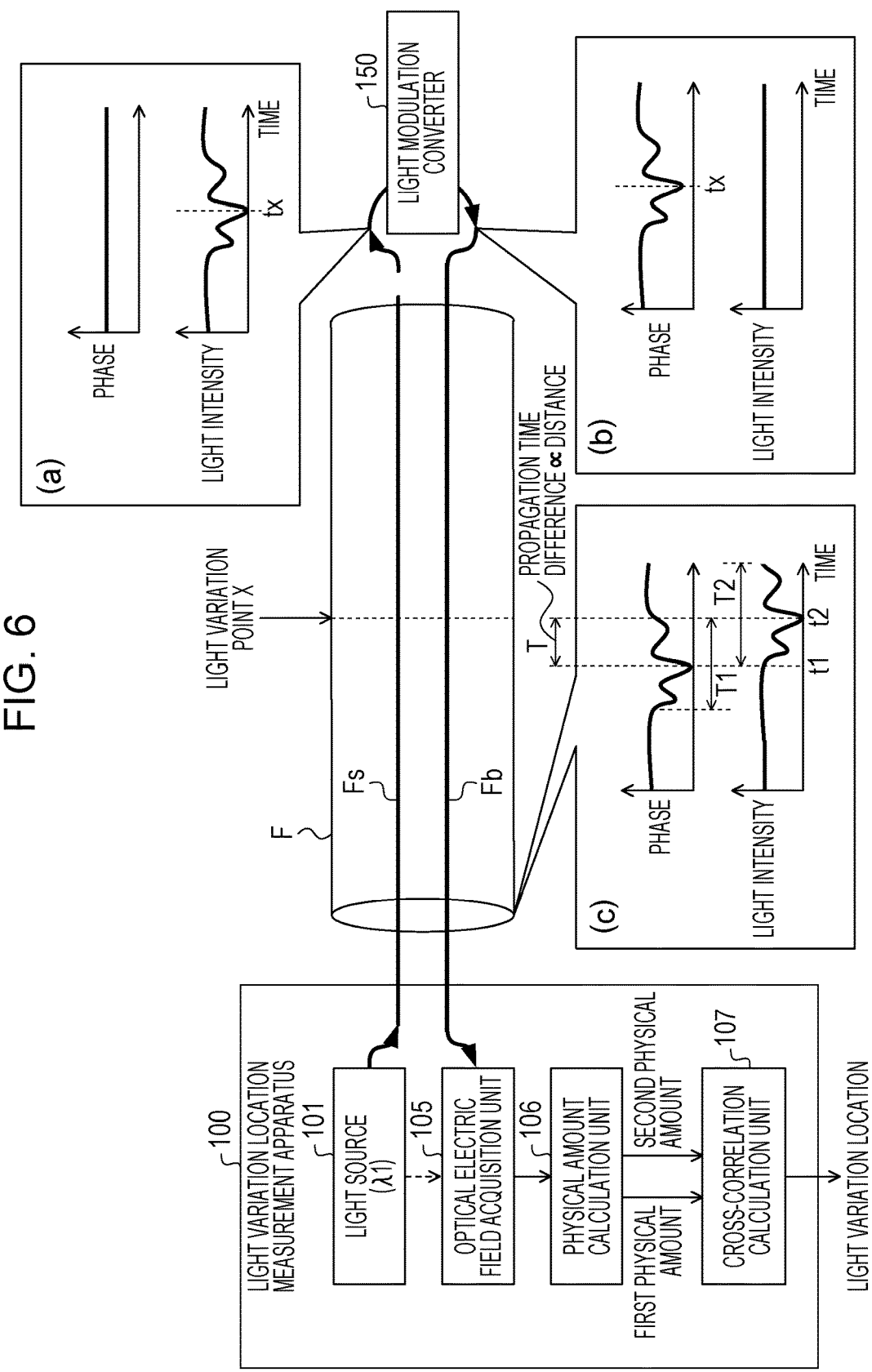
FIG. 6 is a diagram illustrating an entire configuration example including a location-measurement apparatus according to a third embodiment.

FIG. 6 is a diagram illustrating an entire configuration example including a location-measurement apparatus according to a third embodiment. In FIG. 6, the same reference numerals are given to the same constituent units as the first embodiment (FIG. 1), and the inner structure of the location-measurement apparatus 100 is partially omitted.

The third embodiment is a configuration example dealing with 2. light intensity variation described above, in which the light modulation converter 150 converts a light intensity variation generated at the light variation point X on the optical cable F into a phase variation. Further, the location-measurement apparatus 100 receives the phase variation for the outward path included in the light that returns via the optical fiber Fb of the return path, and the light intensity variation generated at the light variation point X on the optical fiber Fb of the return path. The light source 101 outputs continuous oscillation light having a wavelength λ1.

Figure 7:
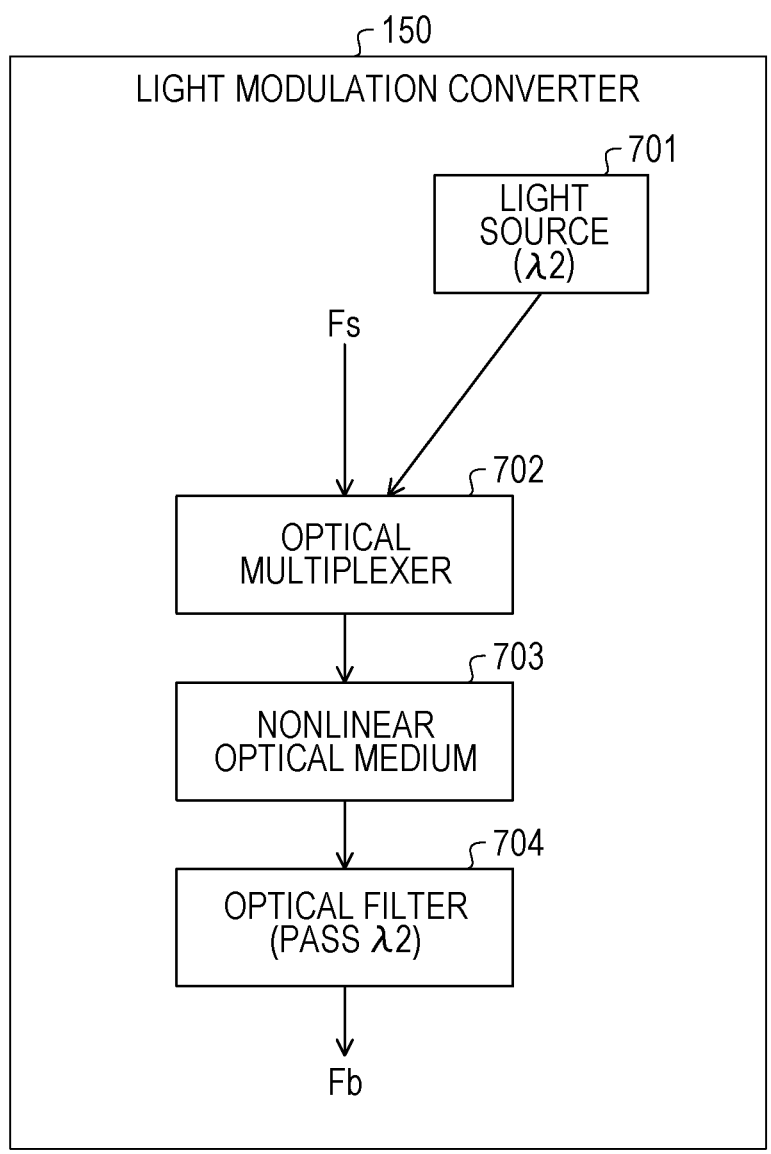
FIG. 7 is a diagram illustrating a configuration example of a light modulation converter according to the third embodiment.

FIG. 7 is a diagram illustrating a configuration example of a light modulation converter according to the third embodiment. The light modulation converter 150 includes a light source 701, an optical multiplexer 702, a nonlinear optical medium 703, and an optical filter 704.

The light source 701 outputs light (continuous oscillating light) having a wavelength λ2. The optical multiplexer 702 multiplexes the light (light intensity variation) that is transmitted through the optical fiber Fs of the outward path with the light (λ2) that is outputted by the light source 701, and outputs the multiplexed light to the nonlinear optical medium 703. The nonlinear optical medium 703 converts, with the light having a wavelength λ2 from the light source 701, the light intensity variation in the optical fiber Fs of the outward path into light of the phase variation, and outputs the converted light. The optical filter 704 allows the light having a wavelength λ2 to pass therethrough, and inputs the light into the optical fiber Fb of the return path.

Figure 8:
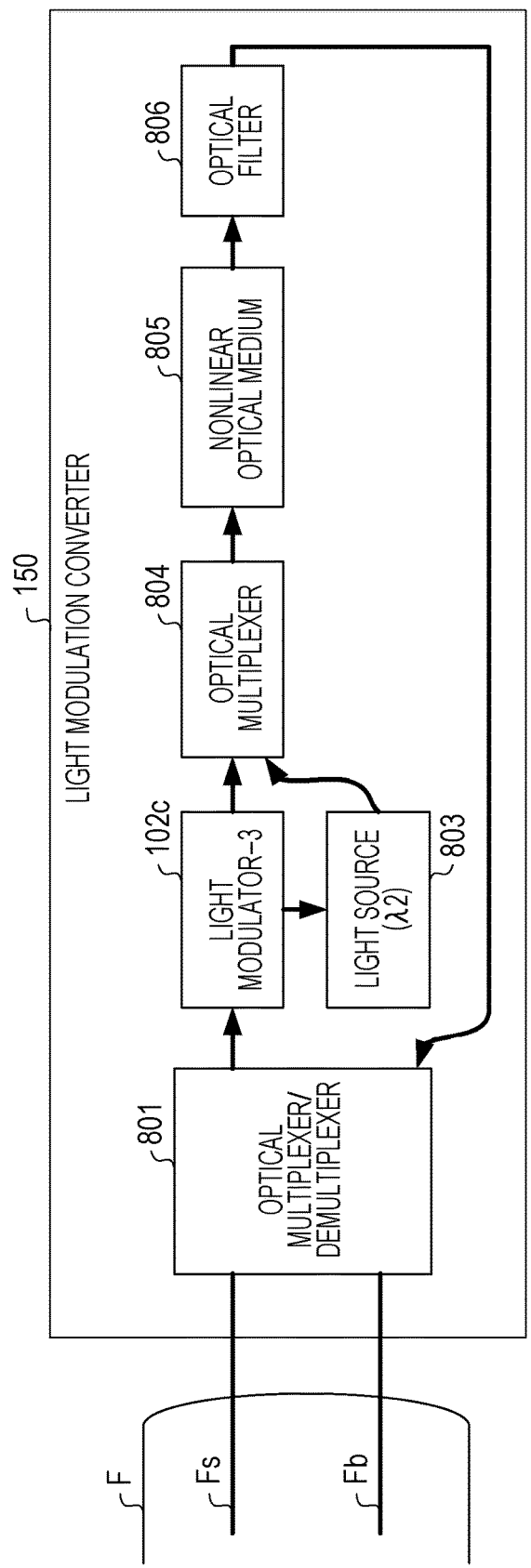
FIG. 8 is a diagram illustrating another configuration example of the light modulation converter according to the third embodiment.

FIG. 8 is a diagram illustrating another configuration example of the light modulation converter according to the third embodiment. The light modulation converter 150 may also be configured to include an optical multiplexer/demultiplexer 801, the third light modulator (light modulator-3) 102c, a light source 803, an optical multiplexer 804, a nonlinear optical medium 805, and an optical filter 806.

The optical multiplexer/demultiplexer 801 demultiplexes light in the optical fiber Fs of the outward path, and outputs the demultiplexed light to the third light modulator 102c. The third light modulator 102c adds a pilot signal to the light, and performs control to stabilize a light variation in the noise level of the received light in the outward path. The light source 803 outputs light (continuous oscillating light) having a wavelength λ2. The optical multiplexer 804 multiplexes the light that is transmitted through the optical fiber Fs of the outward path with the light (λ2) that is outputted by the light source 803, and outputs the multiplexed light to the nonlinear optical medium 805. The nonlinear optical medium 805 converts, with the light having a wavelength λ2 from the light source 803, the light intensity variation in the light of the optical fiber Fs of the outward path to light of the phase variation, and outputs the converted light. The optical filter 806 allows the light having a wavelength λ2 to pass therethrough, and inputs the light into the optical fiber Fb of the return path via the optical multiplexer/demultiplexer 801.

Referring back to FIG. 6, it is assumed that a light variation is generated at the light variation point X on the optical cable F. Part (a) of FIG. 6 is a diagram indicating a state of the physical amount inputted into the light modulation converter 150 on the other terminal of the optical cable F. The longitudinal axis represents the phase and the light intensity, and the horizontal axis represents the time. A light variation is generated (peak tx) by being corresponded to the timing when the light variation is generated at the light variation point X.

Part (b) of FIG. 6 is a diagram indicating a state of the physical amount outputted by the light modulation converter 150 on the other terminal of the optical cable F. The light modulation converter 150 converts the light intensity variation into the phase variation, and the phase variation is generated (peak tx) by being corresponded to the timing when the light variation is generated at the light variation point X.

Part (c) of FIG. 6 is a diagram indicating a state of the physical amount included in the optical fiber Fb of the return path that is inputted into the location-measurement apparatus 100 on one terminal of the optical cable F. The phase variation and the light intensity variation of the light as the physical amounts are inputted into the location-measurement apparatus 100. Herein, the light propagation in the optical fiber Fs of the outward path and the light propagation in the optical fiber Fb of the return path have a propagation time difference T that corresponds to the time (distance) for which the light is turned back through the optical fibers Fs and Fb.

The phase variation timing (peak) is t1 and the phase variation period is T1, which are corresponded to the light variation point X. The light intensity variation timing (peak) is t2 and the light intensity variation period is T2, which are corresponded to the light variation point X.

As illustrated in part (c) of FIG. 6, even when the phase variation period T1 and the light intensity variation period T2 are overlapped with each other, the location-measurement apparatus 100 uses the phase variation and the light intensity variation that are different physical amounts, and thus is able to measure the light variation locations based on these different physical amounts. Herein, the location-measurement apparatus 100 is also able to measure light variation locations even if the period (T1+T2) during when the light variation is generated is larger than a distance resolution that the location-measurement apparatus 100 (the processing unit 200) has.

As explained above, the light modulation converter converts the light intensity variation generated in the optical fiber Fs of the outward path into a phase variation, and the location-measurement apparatus receives a light intensity variation in the optical fiber Fb of the return path as a light intensity variation without any change. Further, the location-measurement apparatus receives the light including these different phase variation and light intensity variation to obtain light variation locations. This allows the location-measurement apparatus to resolve the light intensity variations in the outward path and the return path being temporally overlapped with each other (corresponding to T1+T2 in the above), and to measure the light variation locations.

Fourth Embodiment

Figure 9:
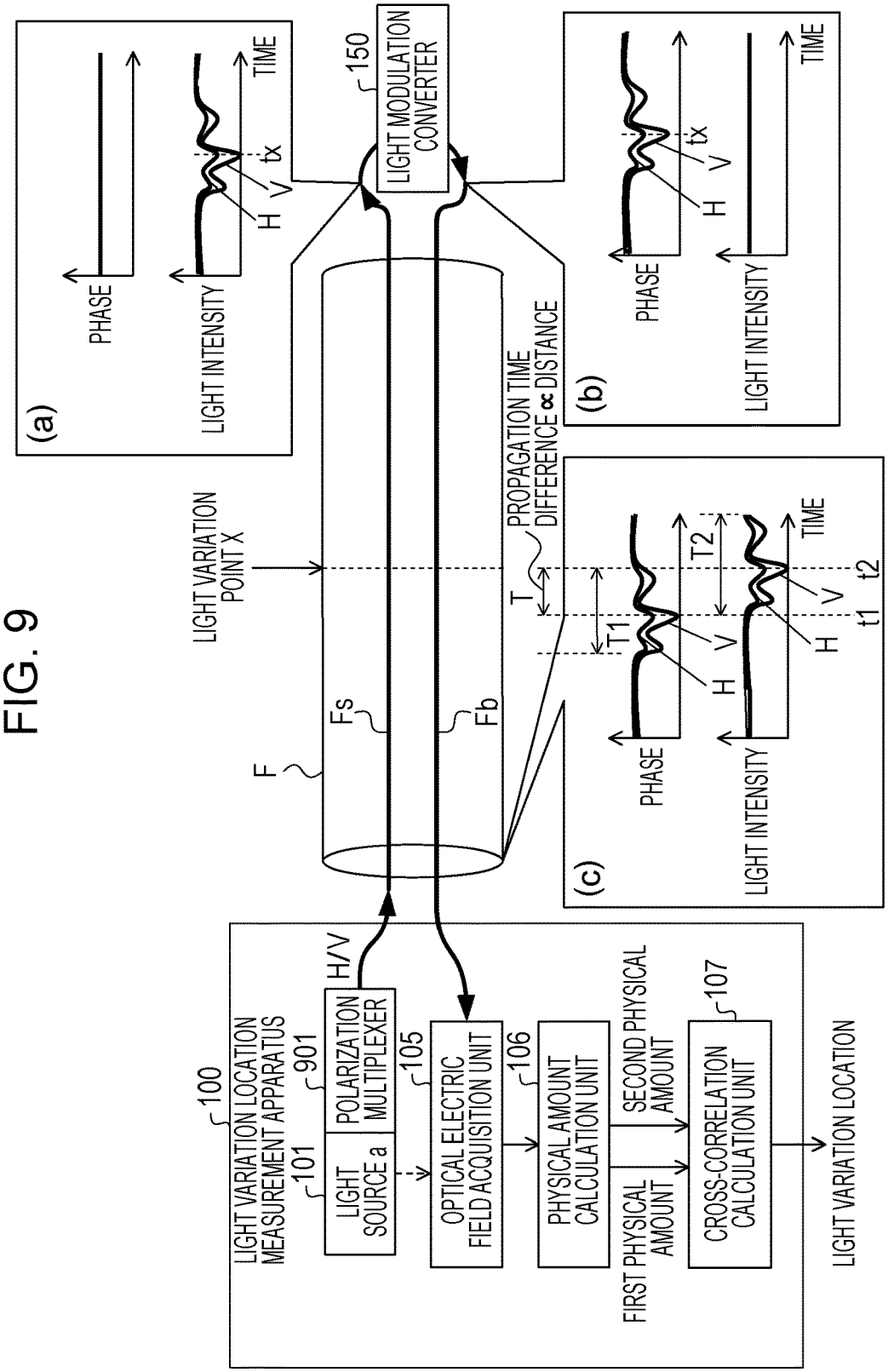
FIG. 9 is a diagram illustrating an entire configuration example including a location-measurement apparatus according to a fourth embodiment.

FIG. 9 is a diagram illustrating an entire configuration example including a location-measurement apparatus according to a fourth embodiment. In FIG. 9, the same reference numerals are given to the same constituent units as the first embodiment (FIG. 1), and the inner structure of the location-measurement apparatus 100 is partially omitted.

The fourth embodiment is a configuration example dealing with 3. PDL variation described above, in which the light modulation converter 150 converts a PDL variation generated at the light variation point X on the optical fiber Fs of the outward path of the optical cable F into a phase variation. Further, the location-measurement apparatus 100 receives the phase variation for the outward path included in the light that returns via the optical fiber Fb of the return path, and the light intensity variation generated at the light variation point X on the optical fiber Fb of the return path. The light source 101 outputs continuous oscillation light of the horizontally-polarized wave H having a wavelength λ1 and continuous oscillation light of the vertically-polarized wave V having a wavelength λ1. A polarization multiplexer 901 polarization-multiplexes continuous oscillation light of the horizontally-polarized wave H having a wavelength λ1 with continuous oscillation light of the vertically-polarized wave V having a wavelength λ1.

Figure 10:
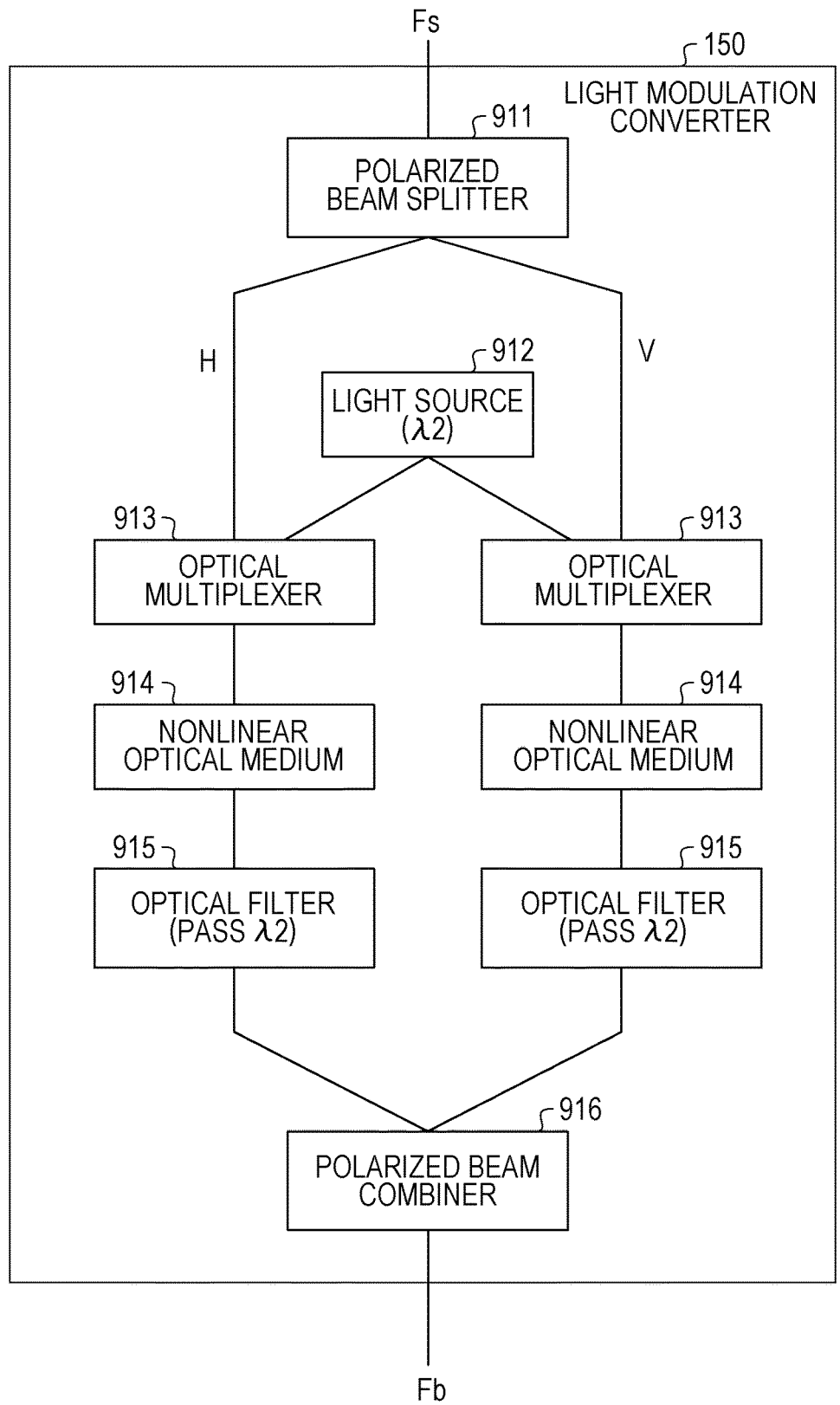
FIG. 10 is a diagram illustrating a configuration example of a light modulation converter according to the fourth embodiment.

FIG. 10 is a diagram illustrating a configuration example of a light modulation converter according to the fourth embodiment. The light modulation converter 150 includes a polarized beam splitter 911, a light source 912, optical multiplexers 913, nonlinear optical media 914, optical filters 915, and a polarized beam combiner 916.

The polarized beam splitter 911 polarization separates the light that is transmitted through the optical fiber Fs of the outward path into light of the horizontally-polarized wave H having a wavelength λ1 and light of the vertically-polarized wave V having a wavelength λ1, and outputs the light respectively to the optical multiplexer 913 for the horizontally-polarized wave H and the optical multiplexer 913 for the vertically-polarized wave V. The light source 912 outputs light having a wavelength λ2 (continuous oscillating light) respectively to the optical multiplexers 913 for the horizontally-polarized wave H and the vertically-polarized wave V.

One group of the optical multiplexer 913 to the optical filter 915 is provided for the light of each of the horizontally-polarized wave H and the vertically-polarized wave V. In the explanation of the configuration on the horizontally-polarized wave H side, the optical multiplexer 913 multiplexes light (light intensity variation) being the horizontally-polarized wave H and transmitted through the optical fiber Fs of the outward path with the light (λ2) outputted by the light source 912, and outputs the multiplexed light to the nonlinear optical medium 914. The nonlinear optical medium 914 converts, with light having a wavelength λ2 from the light source 912, the light intensity variation in light in the optical fiber Fs of the outward path to light of the phase variation, and outputs the converted light. The optical filter 915 allows the light having a wavelength λ2 to pass therethrough. Also at the vertically-polarized wave V side, similarly with respect to light of the vertically-polarized wave V, the light intensity variation is converted into light of the phase variation, and the light having a wavelength λ2 is outputted. The polarized beam combiner 916 polarization-multiplexes the light of the horizontally-polarized wave H with the light of the vertically-polarized wave V, and inputs the light into the optical fiber Fb of the return path.

Figure 11:
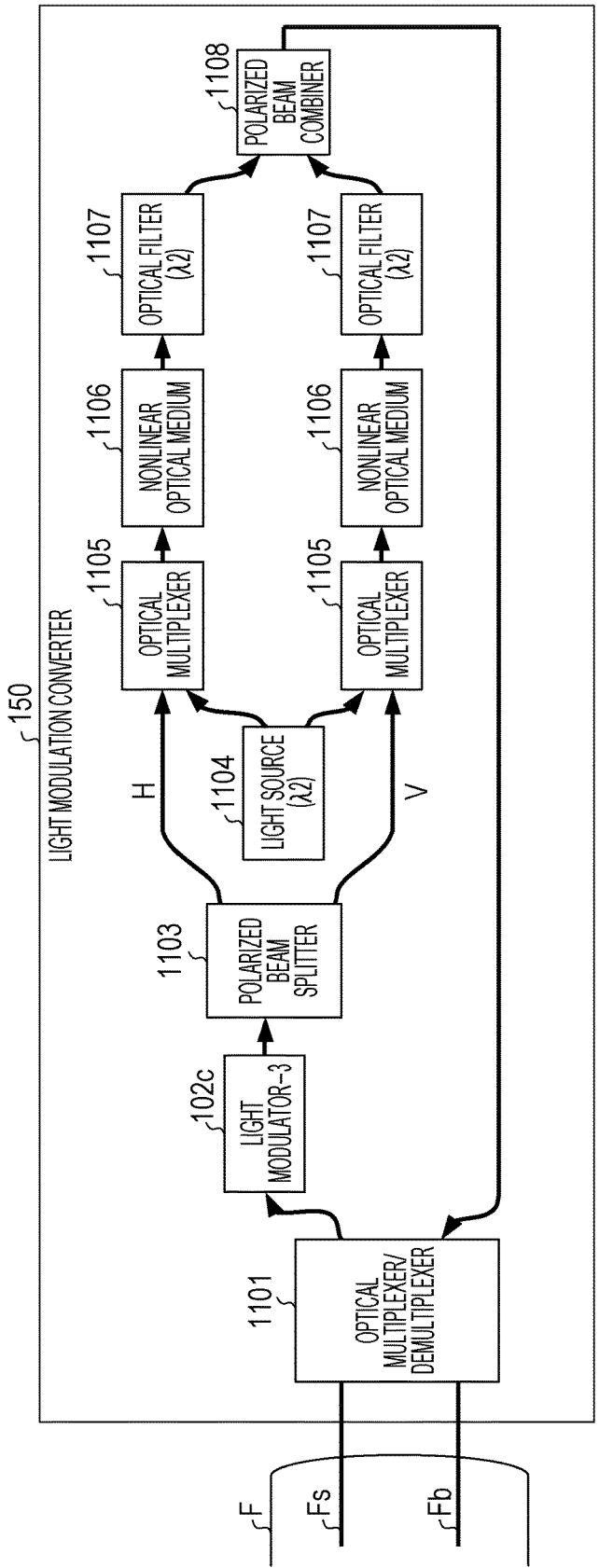
FIG. 11 is a diagram illustrating another configuration example of the light modulation converter according to the fourth embodiment.

FIG. 11 is a diagram illustrating another configuration example of the light modulation converter according to the fourth embodiment. The light modulation converter 150 may also be configured to include an optical multiplexer/demultiplexer 1101, the third light modulator (light modulator-3) 102c, the polarized beam splitter 1103, a light source 1104, optical multiplexers 1105, nonlinear optical media 1106, optical filters 1107, and a polarized beam combiner 1108.

The optical multiplexer/demultiplexer 1101 demultiplexes light in the optical fiber Fs of the outward path, and outputs the demultiplexed light to the third light modulator 102c. The third light modulator 102c adds a pilot signal to the light, and performs control to stabilize a light variation in the noise level of the received light in the outward path. The polarized beam splitter 1103 polarization separates light of the horizontally-polarized wave H having a wavelength λ1 and light of the vertically-polarized wave V having a wavelength λ1, and outputs the light respectively to the optical multiplexer 1105 for the horizontally-polarized wave H and the optical multiplexer 1105 for the vertically-polarized wave V. The light source 1104 outputs light having a wavelength λ2 (continuous oscillating light) respectively to the optical multiplexers 1105 for the horizontally-polarized wave H and the vertically-polarized wave V.

A group of the optical multiplexer 1105 to the optical filter 1107 is provided for the light of each of the horizontally-polarized wave H and the vertically-polarized wave V. In the explanation of the configuration on the horizontally-polarized wave H side, the optical multiplexer 1105 multiplexes light (light intensity variation) being the horizontally-polarized wave H and transmitted through the optical fiber Fs of the outward path with the light (λ2) outputted by the light source 1104, and outputs the multiplexed light to the nonlinear optical medium 1106. The nonlinear optical medium 1106 converts, with light having a wavelength λ2 from the light source 1104, the light intensity variation in light in the optical fiber Fs of the outward path to light of the phase variation, and outputs the converted light. The optical filter 1107 allows the light having a wavelength λ2 to pass therethrough. Also, at the vertically-polarized wave V side, similarly with respect to light of the vertically-polarized wave V, the light intensity variation is converted into light of the phase variation, and the light having a wavelength λ2 is outputted. The polarized beam combiner 1108 polarization-multiplexes the light of the horizontally-polarized wave H with the light the vertically-polarized wave V and inputs the light into the optical fiber Fb of the return path.

Figure 12:
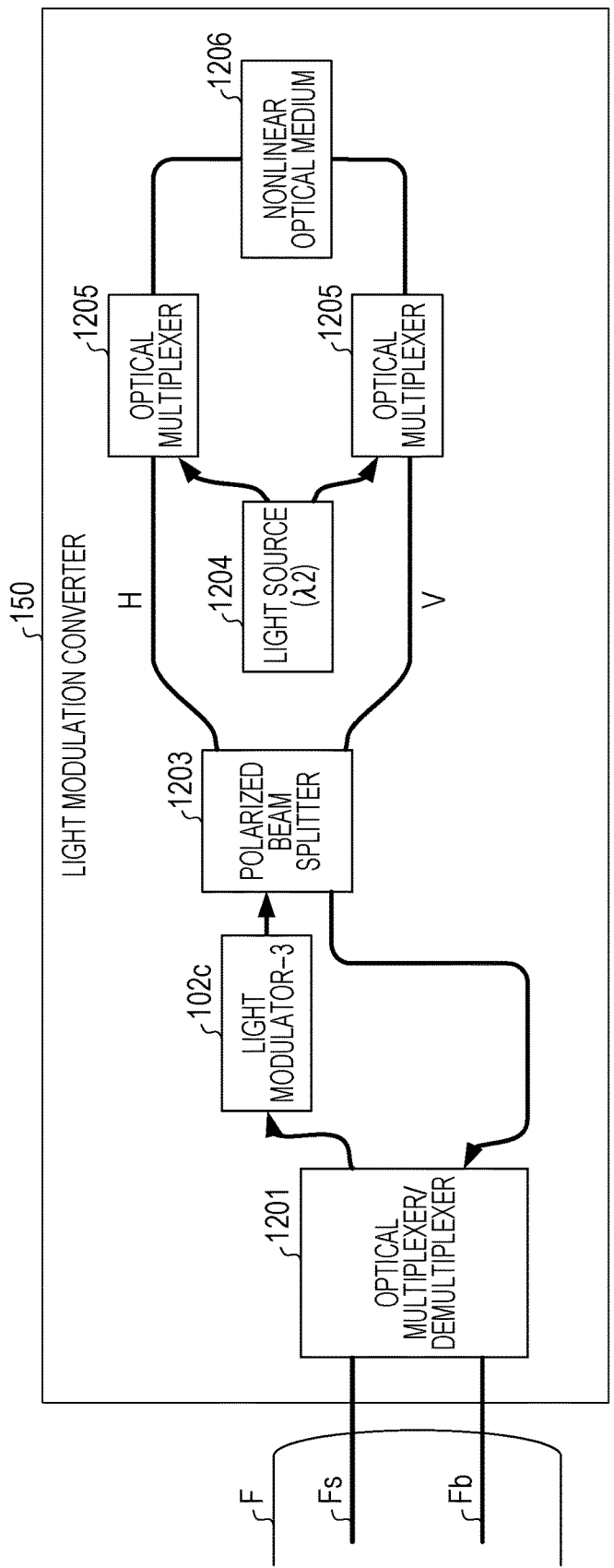
FIG. 12 is a diagram illustrating still another configuration example of the light modulation converter according to the fourth embodiment.

FIG. 12 is a diagram illustrating still another configuration example of the light modulation converter according to the fourth embodiment. The light modulation converter 150 may also be configured to include an optical multiplexer/demultiplexer 1201, the third light modulator (light modulator-3) 102c, a polarized beam splitter 1203, a light source 1204, optical multiplexers 1205, and a nonlinear optical medium 1206.

The optical multiplexer/demultiplexer 1201 demultiplexes light in the optical fiber Fs of the outward path, and outputs the demultiplexed light to the third light modulator 102c. The third light modulator 102c adds a pilot signal to the light, and performs control to stabilize a light variation in the noise level of the received light in the outward path. The polarized beam splitter 1203 polarization separates light of the horizontally-polarized wave H having a wavelength λ1 and light of the vertically-polarized wave V having a wavelength λ1, and outputs the light respectively to the optical multiplexers 1205 for the horizontally-polarized wave H and the optical multiplexer 1205 for the vertically-polarized wave V. The light source 1204 outputs light having a wavelength λ2 (continuous oscillating light) respectively to the optical multiplexers 1205 for the horizontally-polarized wave H and the vertically-polarized wave V.

The optical multiplexers 1205 provided as a pair respectively correspond to the light of the horizontally-polarized wave H and the light of the vertically-polarized wave V. The optical multiplexer 1205 on the horizontally-polarized wave H side multiplexes light (light intensity variation) being the horizontally-polarized wave H and transmitted through the optical fiber Fs of the outward path with the light (λ2) outputted by the light source 1204, and outputs the multiplexed light to the nonlinear optical medium 1206. The optical multiplexer 1205 on the vertically-polarized wave V side multiplexes the light (light intensity variation) transmitted through the optical fiber Fs of the outward path and being the vertically-polarized wave V with the light (λ2) that is outputted by the light source 1204, and outputs the multiplexed light to the nonlinear optical medium 1206.

The nonlinear optical medium 1206 to which the light of the horizontally-polarized wave H having a wavelength λ1 and the light of the vertically-polarized wave V having a wavelength λ1 are inputted converts, with the light having a wavelength λ2 from the light source 1204, the light intensity variation of the light in the optical fiber Fs of the outward path into the phase variation in the light. The light having a wavelength λ2 (the horizontally-polarized wave H and the vertically-polarized wave V) after the conversion by the nonlinear optical medium 1206 is inputted into the optical fiber Fb of the return path via the optical multiplexers 1205, the polarized beam splitter 1203, and the optical multiplexer/demultiplexer 1201.

Referring back to FIG. 9, it is assumed that a light variation is generated at the light variation point X on the optical cable F. Part (a) of FIG. 9 is a diagram indicating a state of the physical amount inputted into the light modulation converter 150 on the other terminal of the optical cable F. The longitudinal axis represents the phase and the light intensity, and the horizontal axis represents the time. Light intensity variations are respectively generated (peaks tx) in the horizontally-polarized wave H and the vertically-polarized wave V by being corresponded to the timing when the light variation is generated at the light variation point X.

Part (b) of FIG. 9 is a diagram indicating a state of the physical amount outputted by the light modulation converter 150 on the other terminal of the optical cable F. The light modulation converter 150 converts the light intensity variation into the phase variation, and phases vary (peaks tx) respectively in the horizontally-polarized wave H and the vertically-polarized wave V by being corresponded to the timing when the light variation is generated at the light variation point X.

Part (c) of FIG. 9 is a diagram indicating a state of the physical amount included in the optical fiber Fb of the return path that is inputted into the location-measurement apparatus 100 on the one terminal of the optical cable F. The phase variation and the light intensity variation of the light as the physical amounts are inputted into the location-measurement apparatus 100. Herein, between the light propagation in the optical fiber Fs of the outward path and the light propagation in the optical fiber Fb of the return path, generated is the propagation time difference T that corresponds to the time (distance) for which the light is turned back by the optical fibers Fs and Fb.

The phase variation timing (peak) is t1 and the phase variation period is T1, which are corresponded to the light variation point X. The light intensity variation timing (peak) is t2 and the light intensity variation period is T2, which are corresponded to the light variation point X.

As illustrated in part (c) of FIG. 9, even when the phase variation period T1 and the light intensity variation period T2 are overlapped with each other, the location-measurement apparatus 100 uses the phase variation and the light intensity variation that are different physical amounts, and thus is able to measure the light variation locations based on these different physical amounts. Herein, the location-measurement apparatus 100 is also able to measure light variation locations even if the period (T1+T2) during when the light variation is generated is larger than a distance resolution that the location-measurement apparatus 100 (the processing unit 200) has. Moreover, the phase variation and the light intensity variation are separated for each of the horizontally-polarized wave H and the vertically-polarized wave V, so that it is possible to measure a light variation location for each polarized wave.

As explained above, the light modulation converter converts the PDL variation generated in the optical fiber Fs of the outward path into a phase variation, and the location-measurement apparatus receives a PDL variation in the optical fiber Fb of the return path as a PDL variation without any change. Further, the location-measurement apparatus receives the light including these different PDL variation and phase variation to obtain light variation locations. This allows the location-measurement apparatus to resolve the PDL variations in the outward path and the return path being temporally overlapped with each other (corresponding to T1+T2 in the above), and to measure the light variation locations.

Fifth Embodiment

Figure 13:
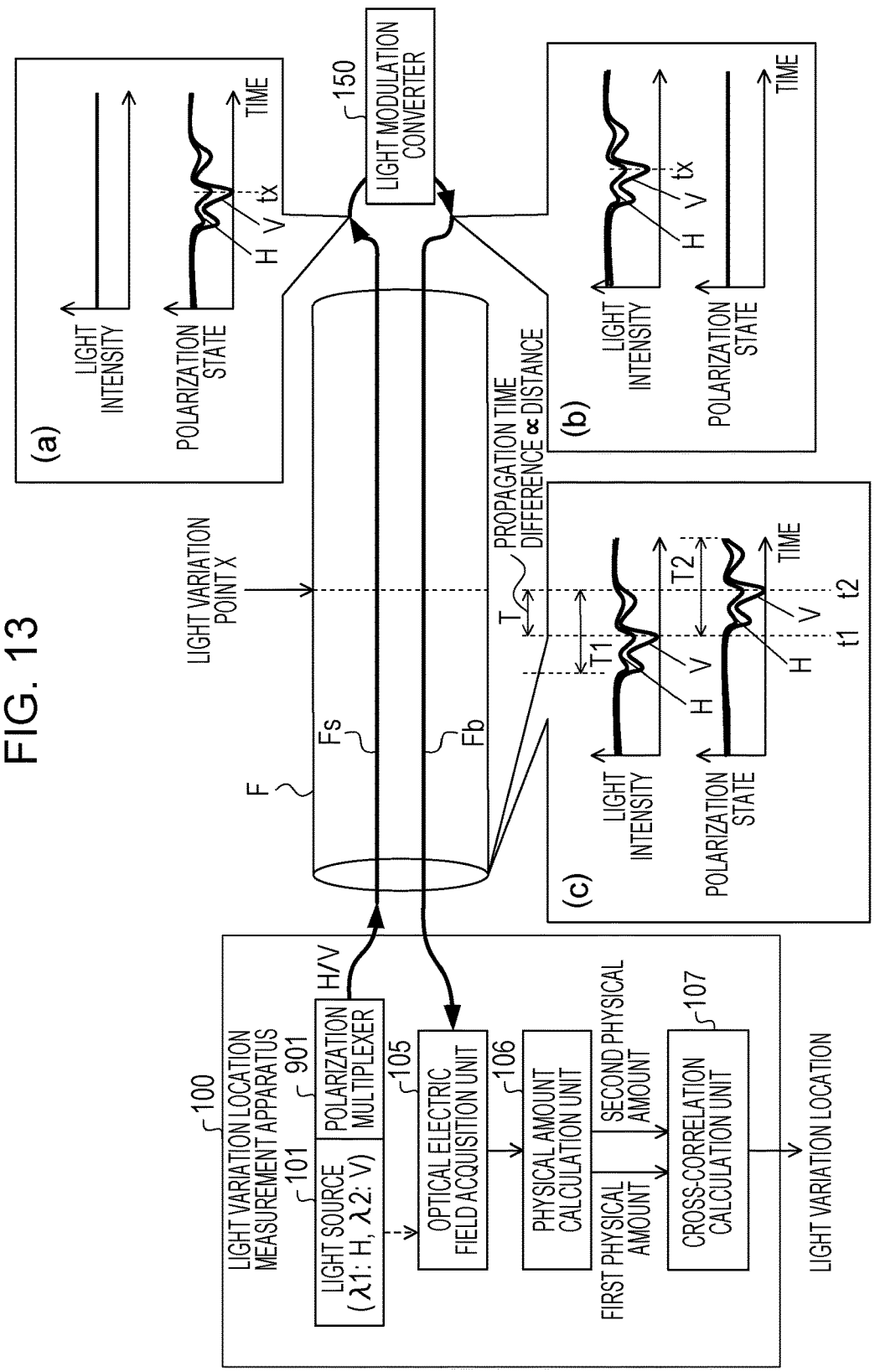
FIG. 13 is a diagram illustrating an entire configuration example including a location-measurement apparatus according to a fifth embodiment.

FIG. 13 is a diagram illustrating an entire configuration example including a location-measurement apparatus according to a fifth embodiment. In FIG. 13, the same reference numerals are given to the same constituent units as the first embodiment (FIG. 1), and the inner structure of the location-measurement apparatus 100 is partially omitted.

The fifth embodiment is a configuration example dealing with 4. PMD variation described above, in which the light modulation converter 150 converts a PMD variation generated at the light variation point X on the optical fiber Fs of the outward path of the optical cable F into a light intensity variation. The location-measurement apparatus 100 receives the light intensity variation for the outward path included in the light that returns via the optical fiber Fb of the return path, and the PMD variation generated at the light variation point X on the optical fiber Fb of the return path. The light source 101 outputs continuous oscillation light of the horizontally-polarized wave H having a wavelength λ1 and continuous oscillation light having a wavelength λ2 and being the vertically-polarized wave V. The polarization multiplexer 901 polarization-multiplexes the light of the horizontally-polarized wave H having a wavelength λ1 with continuous oscillation light having a wavelength λ2 and being the vertically-polarized wave V.

Figure 14:
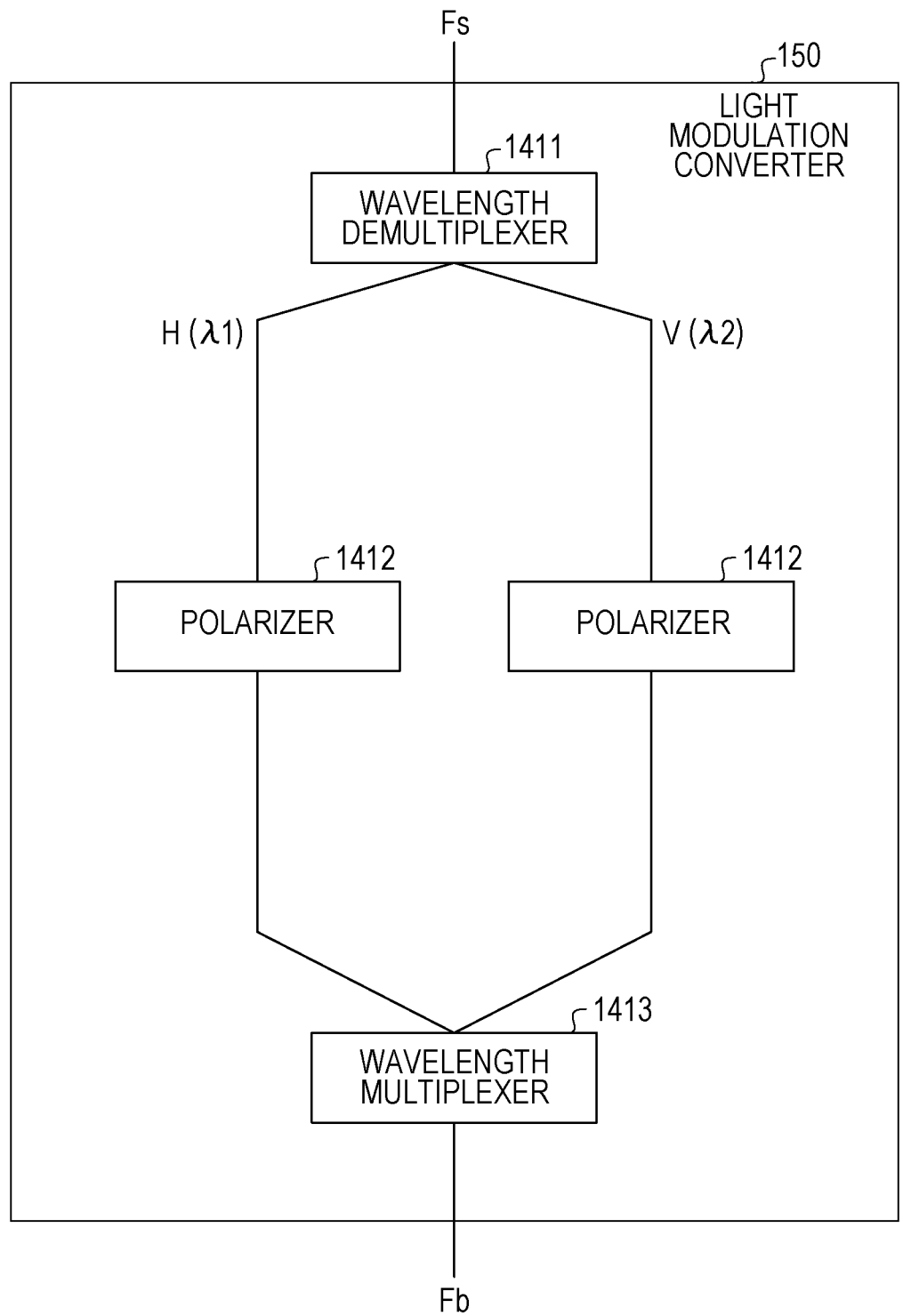
FIG. 14 is a diagram illustrating a configuration example of a light modulation converter according to the fifth embodiment.

FIG. 14 is a diagram illustrating a configuration example of a light modulation converter according to the fifth embodiment. The light modulation converter 150 includes a wavelength demultiplexer 1411, polarizers 1412, and a wavelength multiplexer 1413.

The wavelength demultiplexer 1411 polarization separates the light that is transmitted through the optical fiber Fs of the outward path into light of the horizontally-polarized wave H having a wavelength λ1 and light having a wavelength λ2 and being the vertically-polarized wave V, and outputs the light of the horizontally-polarized wave H and the light of the vertically-polarized wave V respectively to the polarizers 1412.

The polarizers 1412 provided as a pair respectively correspond to the light of the horizontally-polarized wave H and the light of the vertically-polarized wave V. The polarizer 1412 converts the light (polarization variation) having a wavelength λ1 and being the horizontally-polarized wave H into light of light intensity variation. The polarizer 1412 converts the light (polarization variation) light having a wavelength λ2 and being the vertically-polarized wave V into light of light intensity variation. The wavelength multiplexer 1413 multiplexes the light of the horizontally-polarized wave H having a wavelength λ1 with the light having a wavelength λ2 and being the vertically-polarized wave V, and inputs the multiplexed light into the optical fiber Fb of the return path.

Figure 15:
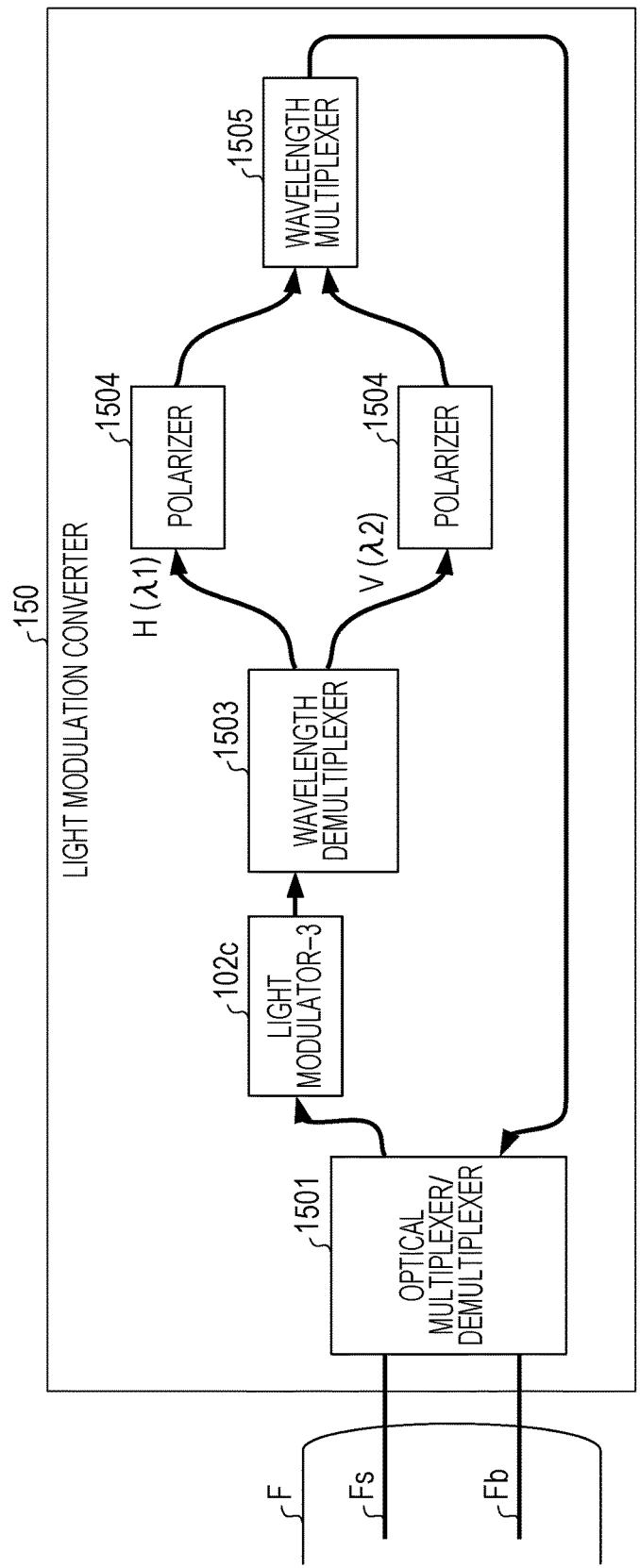
FIG. 15 is a diagram illustrating another configuration example of the light modulation converter according to the fifth embodiment.

FIG. 15 is a diagram illustrating another configuration example of the light modulation converter according to the fifth embodiment. The light modulation converter 150 may also be configured to include an optical multiplexer/demultiplexer 1501, the third light modulator (light modulator-3) 102c, a wavelength demultiplexer 1503, polarizers 1504, and a wavelength multiplexer 1505.

The optical multiplexer/demultiplexer 1501 demultiplexes light in the optical fiber Fs of the outward path, and outputs the demultiplexed light to the third light modulator 102c. The third light modulator 102c adds a pilot signal to the light, and performs control to stabilize a light variation in the noise level of the received light in the outward path. The wavelength demultiplexer 1503 polarization separates light of the horizontally-polarized wave H having a wavelength λ1 and light having a wavelength λ2 and being the vertically-polarized wave V, and outputs the light of the horizontally-polarized wave H and the light of the vertically-polarized wave V respectively to the polarizers 1504.

The polarizers 1504 provided as a pair respectively correspond to the light of the horizontally-polarized wave H and the light of the vertically-polarized wave V. The polarizer 1504 converts the light (polarization variation) having a wavelength λ1 and being the horizontally-polarized wave H into light of light intensity variation. The polarizer 1504 converts the light (polarization variation) light having a wavelength λ2 and being the vertically-polarized wave V into light of light intensity variation. The wavelength multiplexer 1505 multiplexes the light of the horizontally-polarized wave H having a wavelength λ1 with the light having a wavelength λ2 and being the vertically-polarized wave V, and inputs the multiplexed light into the optical fiber Fb of the return path.

Referring back to FIG. 13, it is assumed that a light variation is generated at the light variation point X on the optical cable F. Part (a) of FIG. 13 is a diagram indicating a state of the physical amount inputted into the light modulation converter 150 on the other terminal of the optical cable F. The longitudinal axis represents the light intensity and the polarization state, and the horizontal axis represents the time. Polarization variations are respectively generated (peaks tx) in the horizontally-polarized wave H having a wavelength λ1 and the vertically-polarized wave V having a wavelength λ2 by being corresponded to the timing when the light variation is generated at the light variation point X.

Part (b) of FIG. 13 is a diagram indicating a state of the physical amount outputted by the light modulation converter 150 on the other terminal of the optical cable F. The light modulation converter 150 converts the polarization variation into the light intensity variation, and phases vary (peaks tx) respectively in the horizontally-polarized wave H having a wavelength λ1 and the vertically-polarized wave V having a wavelength λ2 by being corresponded to the timing when the light variation is generated at the light variation point X.

Part (c) of FIG. 13 is a diagram indicating a state of the physical amount included in the optical fiber Fb of the return path that is inputted into the location-measurement apparatus 100 on the one terminal of the optical cable F. The light intensity variation and the polarization variation of the light as the physical amounts are inputted into the location-measurement apparatus 100. Herein, between the light propagation in the optical fiber Fs of the outward path and the light propagation in the optical fiber Fb of the return path, generated is the propagation time difference T that corresponds to the time (distance) for which the light is turned back by the optical fibers Fs and Fb.

The light intensity variation timing (peak) is t1 and the light intensity variation period is T1, which corresponds to the light variation point X. The polarization variation timing (peak) is t2 and the polarization variation period is T2, which are corresponded to the light variation point X.

As illustrated in part (c) of FIG. 13, even when the light intensity variation period T1 and the polarization variation period T2 are overlapped with each other, the location-measurement apparatus 100 uses the light intensity variation and the polarization variation that are different physical amounts, and thus is able to measure the light variation locations based on these different physical amounts. Herein, the location-measurement apparatus 100 is also able to measure light variation locations even if the period (T1+T2) during when the light variation is generated is larger than a distance resolution that the location-measurement apparatus 100 (the processing unit 200) has. Moreover, the light intensity variation and the polarization variation are separated for each of the horizontally-polarized wave H and the vertically-polarized wave V, so that it is possible to measure a light variation location for each polarized wave.

Figure 16:
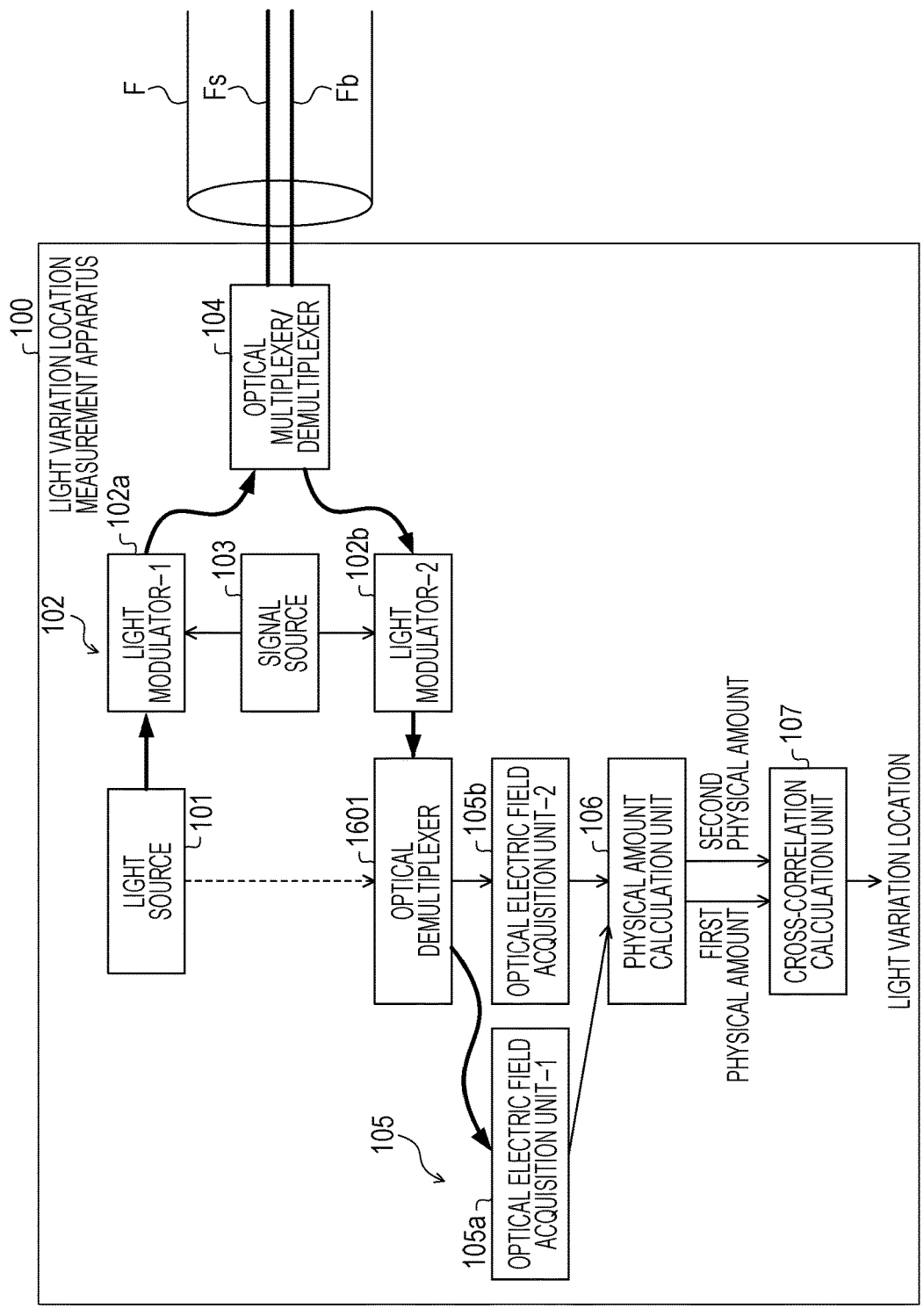
FIG. 16 is a diagram illustrating another configuration example of the location-measurement apparatus according to the fifth embodiment.

FIG. 16 is a diagram illustrating another configuration example of the location-measurement apparatus according to the fifth embodiment. In the case that corresponds to the PMD variation in the fifth embodiment, FIG. 16 illustrates an application example where the optical electric field acquisition unit 105 (see FIG. 1) is unable to collectively acquire two wavelengths λ1 and λ2 that are transmitted through the optical fiber Fb of the return path.

Accordingly, as illustrated in FIG. 16, an optical demultiplexer 1601, and two optical electric field acquisition units 105 (a first optical electric field acquisition unit 105a and a second optical electric field acquisition unit 105b) are newly provided. The optical demultiplexer 1601 guides light having a first wavelength (λ1) to the first optical electric field acquisition unit (optical electric field acquisition unit-1) 105a, and guides light having a second wavelength (λ2) to the second optical electric field acquisition unit (optical electric field acquisition unit-2) 105b. This allows the first optical electric field acquisition unit 105a to acquire an optical electric field based on the light after the demultiplex having the first wavelength (λ1), and the second optical electric field acquisition unit 105b to acquire an optical electric field based on the light after the demultiplex having the second wavelength (λ2).

As explained above, the light modulation converter converts the PMD variation (wavelength dependent polarization variation) generated in the optical fiber Fs of the outward path into a light intensity variation, and the location-measurement apparatus receives a PMD variation in the optical fiber Fb of the return path as a PMD variation without any change. Further, the location-measurement apparatus receives the light including these different light intensity variation and PMD variation to obtain light variation locations. This allows the location-measurement apparatus to resolve the PMD variations in the outward path and the return path being temporally overlapped with each other (corresponding to T1+T2 in the above), and to measure the light variation locations.

Sixth Embodiment

Figure 17:
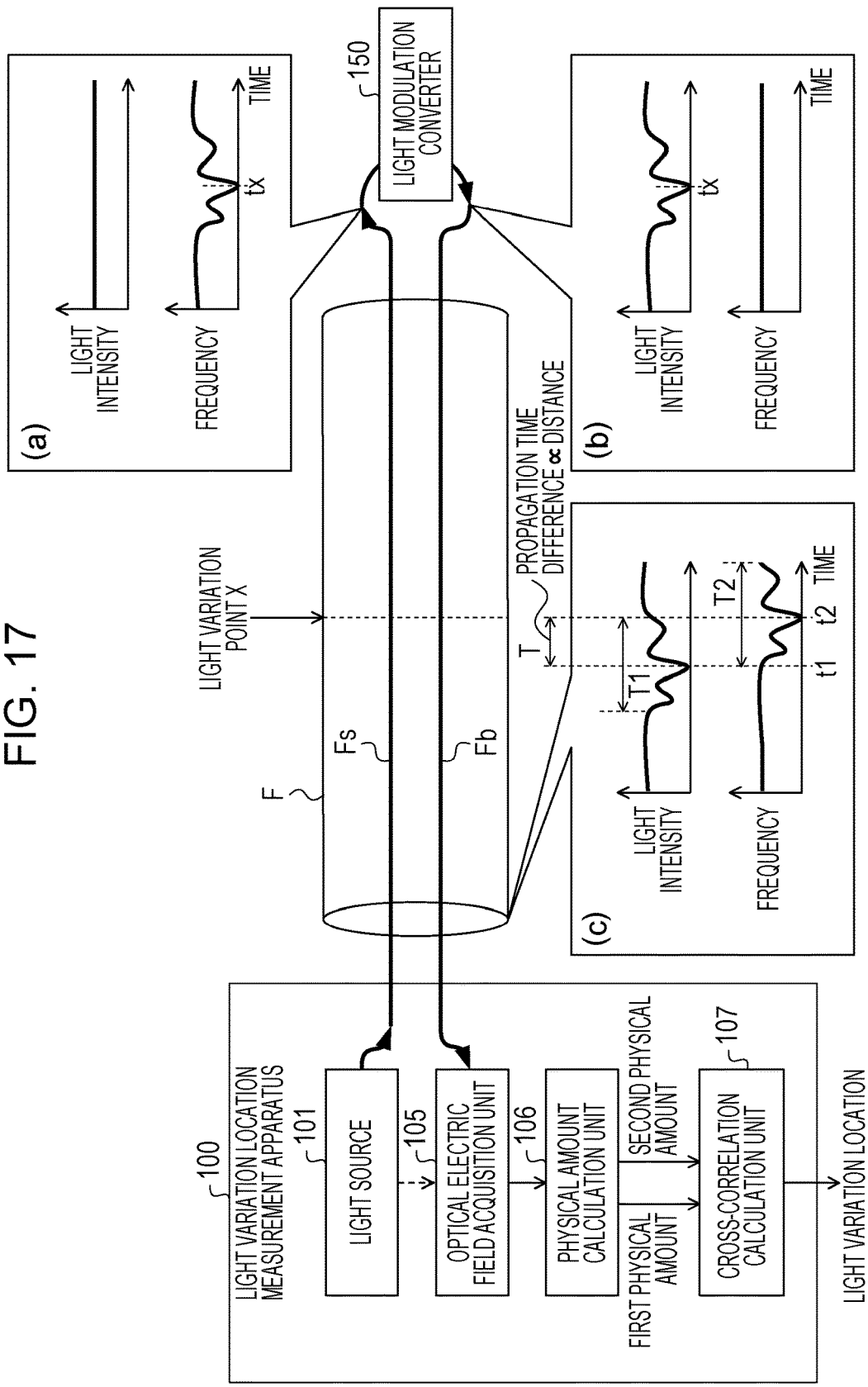
FIG. 17 is a diagram illustrating an entire configuration example including a location-measurement apparatus according to a sixth embodiment.

FIG. 17 is a diagram illustrating an entire configuration example including a location-measurement apparatus according to a sixth embodiment. In FIG. 17, the same reference numerals are given to the same constituent units as the first embodiment (FIG. 1), and the inner structure of the location-measurement apparatus 100 is partially omitted.

The sixth embodiment is a configuration example dealing with 5. frequency variation described above, in which the light modulation converter 150 converts a frequency variation generated at the light variation point X on the optical fiber Fs of the outward path of the optical cable F into a light intensity variation. The location-measurement apparatus 100 receives the light intensity variation for the outward path included in the light that returns via the optical fiber Fb of the return path, and the frequency variation generated at the light variation point X on the optical fiber Fb of the return path. The light source 101 outputs continuous oscillation light having a single wavelength (λ1).

Figure 18:
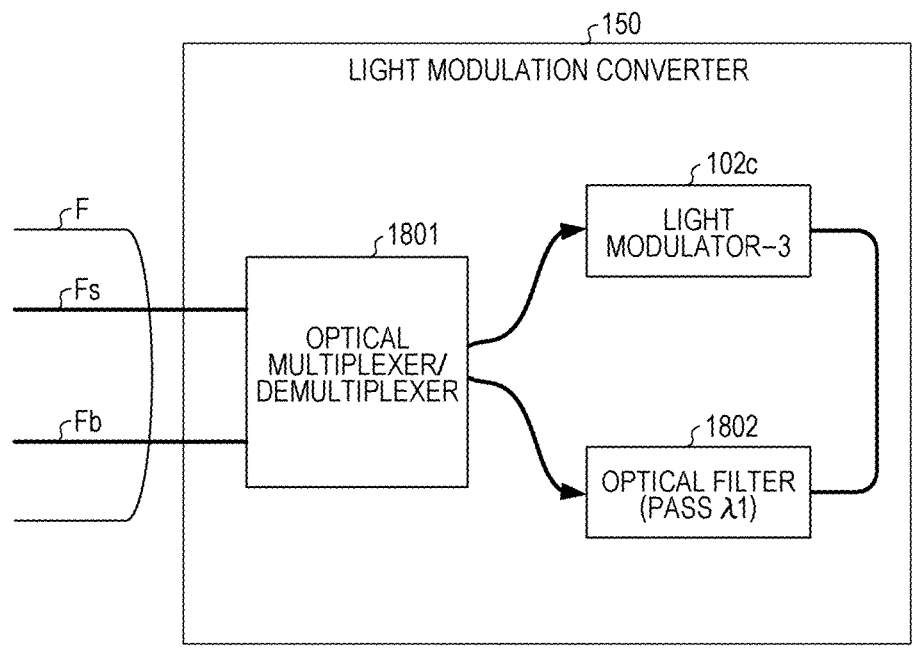
FIG. 18 is a diagram illustrating a configuration example of a light modulation converter according to the sixth embodiment.

FIG. 18 is a diagram illustrating a configuration example of a light modulation converter according to the sixth embodiment. The light modulation converter 150 may be configured using an optical filter that allows the light having a wavelength λ1 to pass therethrough. In addition, as illustrated in FIG. 18, the light modulation converter 150 may also be configured to include an optical multiplexer/demultiplexer 1801 that is coupled to the optical fiber Fs of the outward path and the optical fiber Fb of the return path, the third light modulator (light modulator-3) 102c, and an optical filter 1802 that allows the light having a wavelength λ1 to pass therethrough.

The light that is transmitted through the optical fiber Fs of the outward path is demultiplexed by the optical multiplexer/demultiplexer 1801, and inputted into the third light modulator 102c. The third light modulator 102c adds a pilot signal to the light, and performs control to stabilize a light variation in the noise level of the received light in the outward path. The optical filter 1802 converts the frequency variation of the light into a light intensity variation. The converted light is inputted into the optical fiber Fb of the return path.

Referring back to FIG. 17, it is assumed that a light variation is generated at the light variation point X on the optical cable F. Part (a) of FIG. 17 is a diagram indicating a state of the physical amount inputted into the light modulation converter 150 on the other terminal of the optical cable F. The longitudinal axis represents the light intensity and the frequency, and the horizontal axis represents the time. A frequency variation is generated (peak tx) by being corresponded to the timing when the light variation is generated at the light variation point X.

Part (b) of FIG. 17 is a diagram indicating a state of the physical amount outputted by the light modulation converter 150 on the other terminal of the optical cable F. The light modulation converter 150 converts the frequency variation into the light intensity variation, and the light intensity varies (peak tx) by being corresponded to the timing when the light variation is generated at the light variation point X.

Part (c) of FIG. 17 is a diagram indicating a state of the physical amount included in the optical fiber Fb of the return path that is inputted into the location-measurement apparatus 100 on one terminal of the optical cable F. The light intensity variation and the frequency variation of the light as the physical amounts are inputted into the location-measurement apparatus 100. Herein, between the light propagation in the optical fiber Fs of the outward path and the light propagation in the optical fiber Fb of the return path, generated is the propagation time difference T that corresponds to the time (distance) for which the light is turned back by the optical fibers Fs and Fb.

The light intensity variation timing (peak) is t1 and the light intensity variation period is T1, which corresponds to the light variation point X. The frequency variation timing (peak) is t2 and the frequency variation period is T2, which are corresponded to the light variation point X.

As illustrated in part (c) of FIG. 17, even when the light intensity variation period T1 and the frequency variation period T2 are overlapped with each other, the location-measurement apparatus 100 uses the light intensity variation and the frequency variation that are different physical amounts. This allows the location-measurement apparatus 100 to measure the light variation locations based on these different physical amounts. Herein, the location-measurement apparatus 100 is also able to measure light variation locations even if the period (T1+T2) during when the light variation is generated is larger than a distance resolution that the location-measurement apparatus 100 (the processing unit 200) has.

As explained above, the light modulation converter converts the frequency variation generated in the optical fiber Fs of the outward path into a light intensity variation, and the location-measurement apparatus receives a frequency variation in the optical fiber Fb of the return path as a frequency variation without any change. Further, the location-measurement apparatus receives the light including these different light intensity variation and frequency variation to obtain light variation locations. This allows the location-measurement apparatus to resolve the frequency variations in the outward path and the return path being temporally overlapped with each other (corresponding to T1+T2 in the above), and to measure the light variation locations.

Seventh Embodiment

In a seventh embodiment, a detailed configuration of the optical electric field acquisition unit 105 of the location-measurement apparatus 100 described above is described. Hereinafter, configuration examples of the optical electric field acquisition unit 105 corresponding to the coherent reception (detection) is described.

Figure 19:
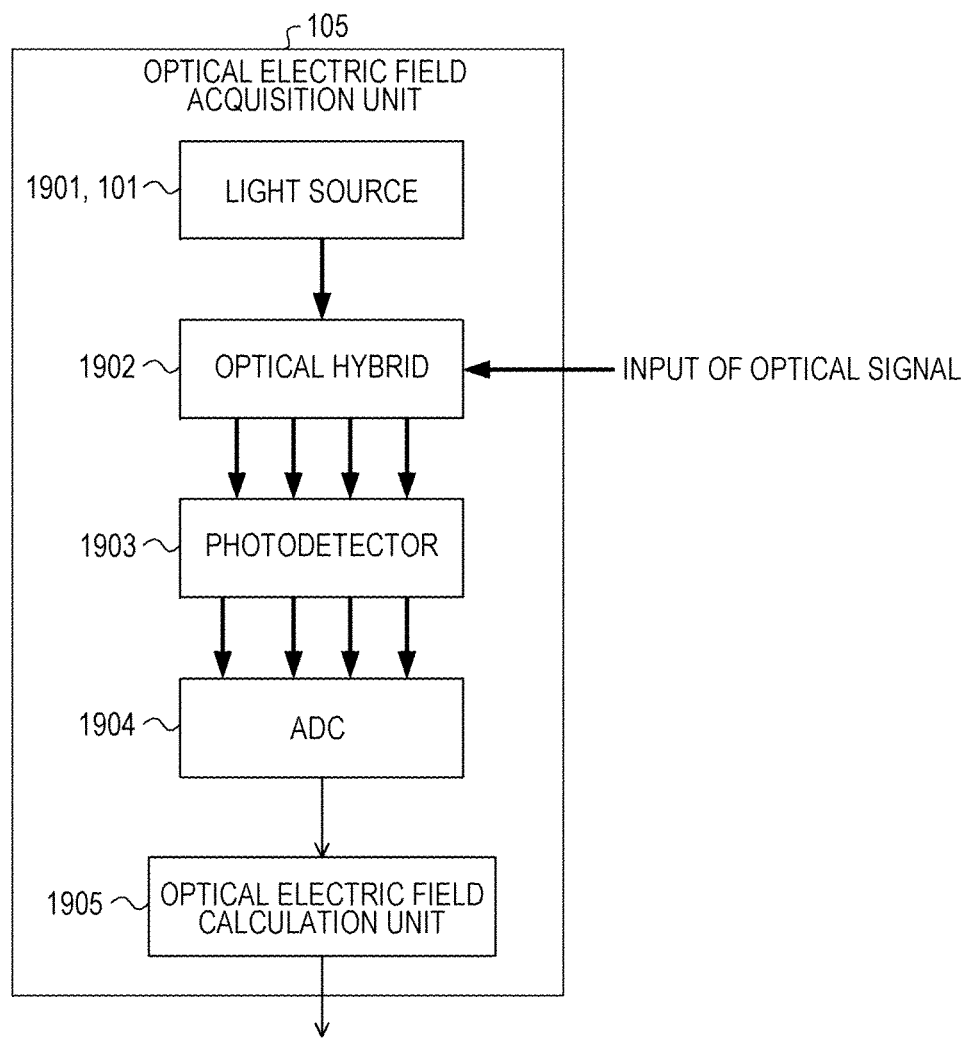
FIG. 19 is a diagram illustrating a configuration example of an optical electric field acquisition unit of a location-measurement apparatus according to a seventh embodiment.

FIG. 19 is a diagram illustrating a configuration example of an optical electric field acquisition unit of a location-measurement apparatus according to the seventh embodiment. The optical electric field acquisition unit 105 includes a light source 1901, an optical hybrid 1902, a photodetector (PD) 1903, an AD converter (ADC) 1904, and an optical electric field calculation unit 1905.

Light emitted by the light source 1901 and an optical signal outputted from the optical fiber Fb of the return path are inputted into the optical hybrid 1902, and an output from the optical hybrid 1902 is photoelectrically converted by the photodetector (PD) 1903. An output from the PD 1903 is digitally converted by the AD converter (ADC) 1904, and is outputted to the optical electric field calculation unit 1905. For example, the functions of the ADC 1904 and the optical electric field calculation unit 1905 may be included in the processing unit 200 (see FIG. 2).

Figure 20:
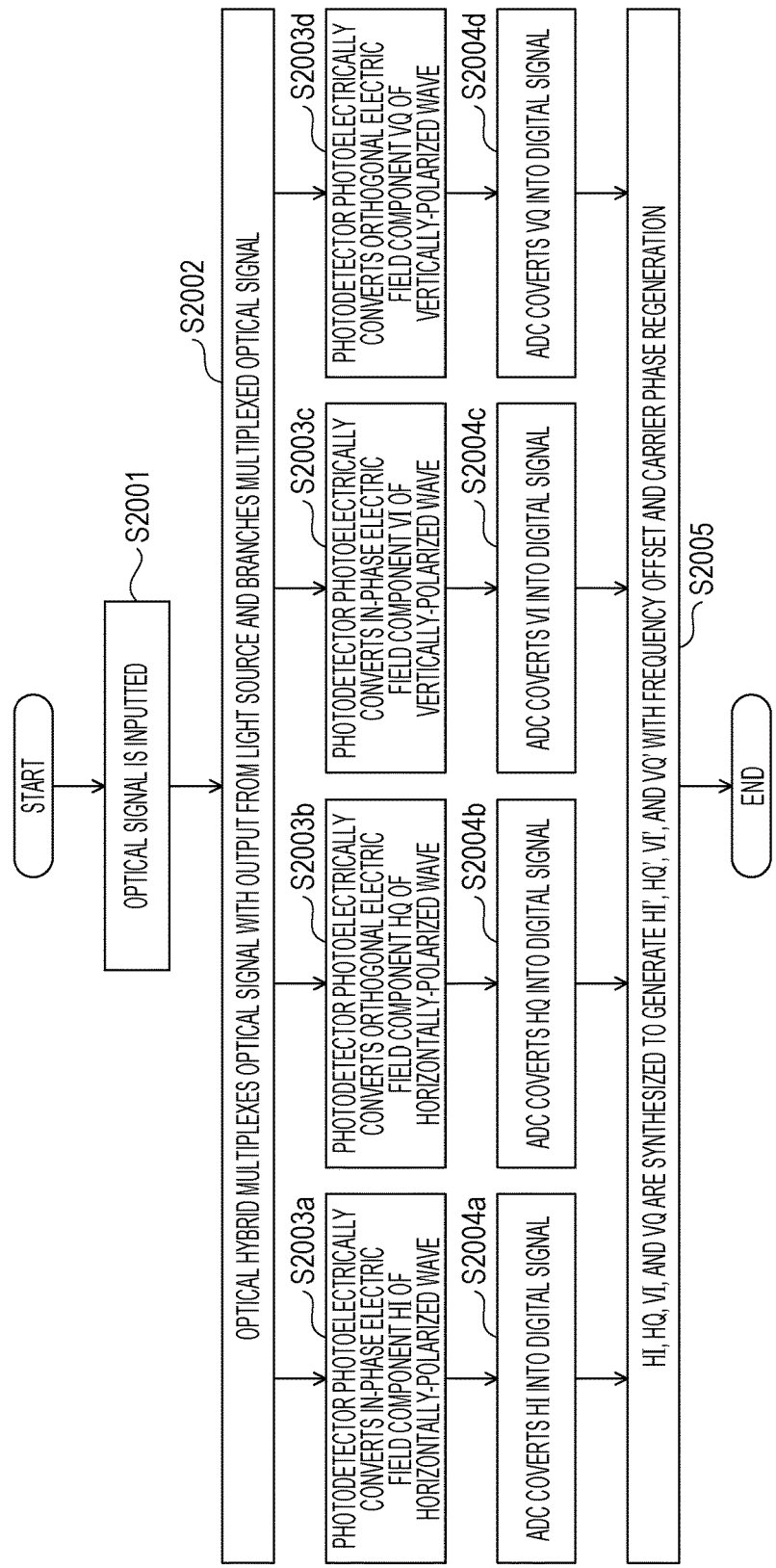
FIG. 20 is a flowchart illustrating an operation content of each unit of the optical electric field acquisition unit in FIG. 19.

FIG. 20 is a flowchart illustrating an operation content of each unit of the optical electric field acquisition unit in FIG. 19. The light source 1901 outputs continuous oscillation light as reference light to the optical hybrid 1902. For example, the light from the light source 101 may be branched and outputted to the optical hybrid 1902, and in this case, no light source 1901 may be provided. The wavelength of light from the light source 1901 is the same as the wavelength ($\lambda 1$ or $\lambda 2$) of light from the light source 101, which is used in each of the second to sixth embodiments described above.

An optical signal received from the optical fiber Fb of the return path is inputted into the optical hybrid 1902 (Step S2001). The optical hybrid 1902 multiplexes the reference light from the light source 1901 with the inputted optical signal, and then branches the multiplexed light into a plurality of electric field components (HI, HQ, VI, and VQ) (Step S2002).

The photodetectors (PDs) 1903 that are provided so as to correspond to the plurality of electric field components (HI, HQ, VI, and VQ) photoelectrically convert the respective electric field components (Step S2003). The PDs 1903 respectively photoelectrically convert the in-phase electric field component HI of the horizontally-polarized wave H (Step S2003a), the orthogonal electric field component HQ of the horizontally-polarized wave H (Step S2003b), the in-phase electric field component VI of the vertically-polarized wave V (Step S2003c), and the orthogonal electric field component VQ of the vertically-polarized wave V (Step S2003d).

The AD converter (ADC) 1904 converts each of the HI, HQ, VI, and VQ after the photoelectric conversion into a digital signal (Steps S2004a to 2004d). The output from the ADC 1904 is inputted into the optical electric field calculation unit 1905. The optical electric field calculation unit 1905 synthesizes the respective HI, HQ, VI, and VQ after the digital conversion to generate data HI', HQ', VI', and VQ' in which the frequency offset and the carrier phase reproduction are carried out (Step S2005), and outputs the data to the physical amount calculation unit 106.

Figure 21:
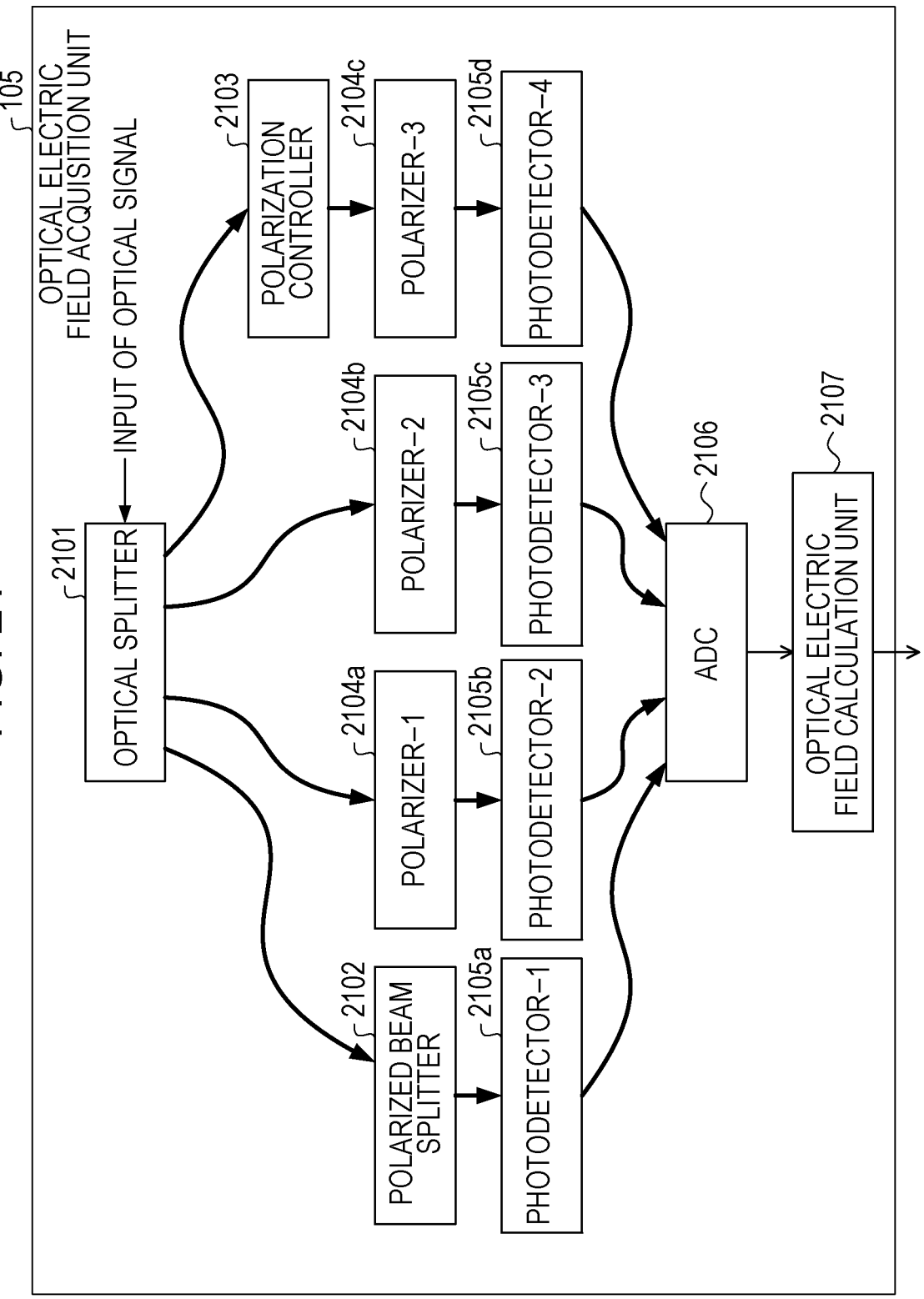
FIG. 21 is a diagram illustrating another configuration example of the optical electric field acquisition unit of the location-measurement apparatus according to the seventh embodiment.

FIG. 21 is a diagram illustrating another configuration example of the optical electric field acquisition unit of the location-measurement apparatus according to the seventh embodiment. The optical electric field acquisition unit 105 includes an optical splitter 2101, a polarized beam splitter 2102, a polarization controller 2103, a plurality of polarizers 2104, a plurality of photodetectors (PD) 2105, and an AD converter (ADC) 2106, and an optical electric field calculation unit 2107.

An optical signal outputted from the optical fiber Fb of the return path is branched by the optical splitter 2101, and the branched signals are photoelectrically converted by the photodetectors (PDs) 2105. The polarized beam splitter 2102 is disposed at the front stage of the first PD 2105a, the polarizer 2104a and 2104b are respectively disposed at the front stages of the second and third PDs 2105b and 2015c, and the polarization controller 2103 and the polarizer 2104c are disposed at the front stage of the fourth PD 2105d. Outputs from the respective PDs 2105a to 2105d are digitally converted by the AD converter (ADC) 2106, and then outputted to the optical electric field calculation unit 2107. For example, the functions of the ADC 2106, and the optical electric field calculation unit 2107 may be included in the processing unit 200 (see FIG. 2).

Figure 22:
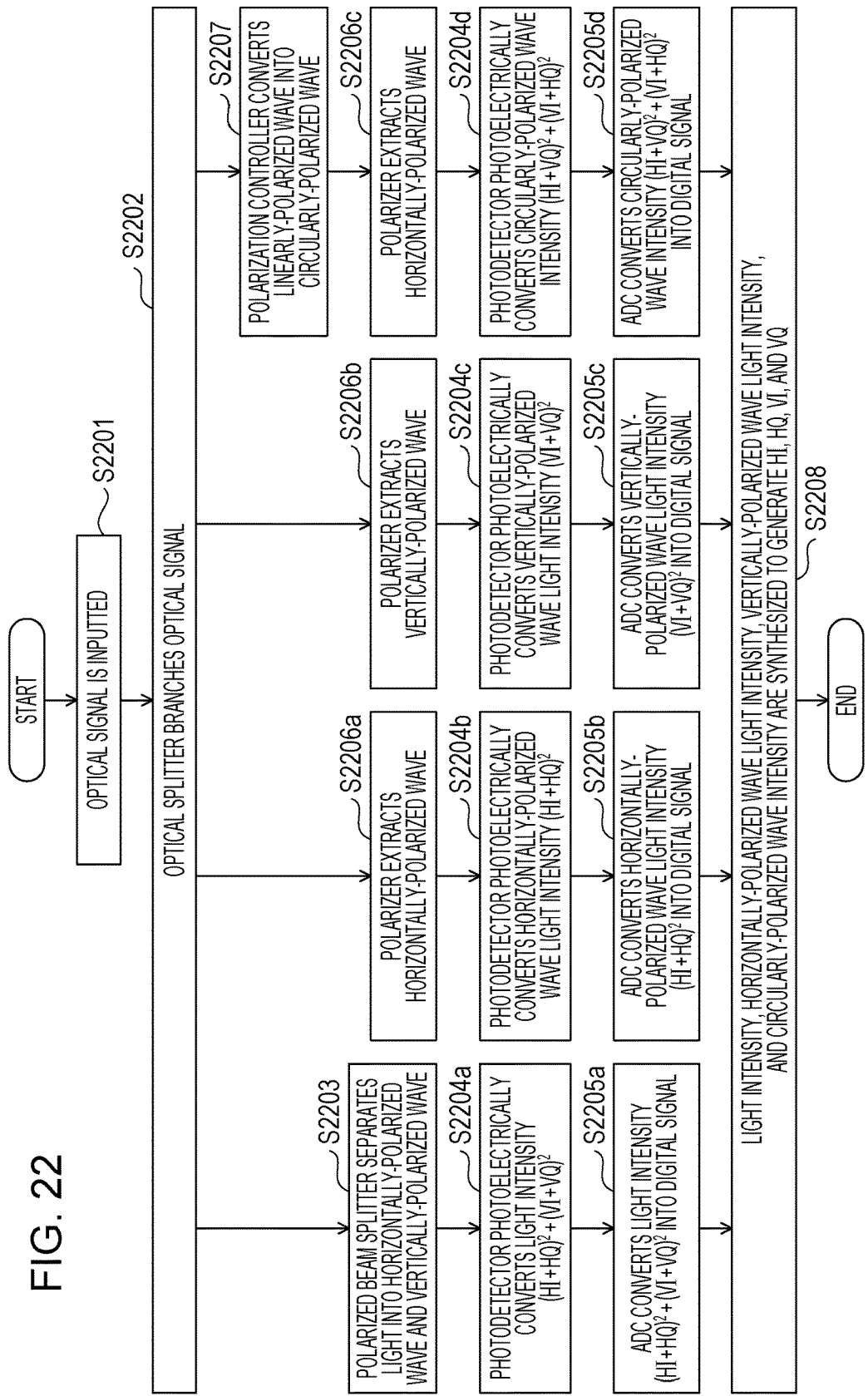
FIG. 22 is a flowchart illustrating an operation content of each unit of the optical electric field acquisition unit in FIG. 21.

FIG. 22 is a flowchart illustrating an operation content of each unit of the optical electric field acquisition unit in FIG. 21. An optical signal received from the optical fiber Fb of the return path is inputted into the optical splitter 2101 (Step S2201). The optical splitter 2101 branches and outputs the inputted optical signal into a plurality (four in the example of FIG. 21) (Step S2202). The optical signal is branched, and the branched optical signals are respectively outputted to the polarized beam splitter 2102, the first polarizer (polarizer-1) 2104a, the second polarizer (polarizer-2) 2104b, and the polarization controller 2103.

The polarized beam splitter 2102 separates the light having been branched into the polarized beam splitter 2102 into the horizontally-polarized wave H and the vertically-polarized wave V (Step S2203). Thereafter, the first photodetector (PD-1) 2105a photoelectrically converts the light intensity $(HI+HQ)^2+(VI+VQ)^2$ (Step S2204a). Thereafter, the ADC 2106 converts the light intensity $(HI+HQ)^2+(VI+VQ)^2$ into a digital signal (Step S2205a), and outputs the digital signal to the optical electric field calculation unit 2107.

From the light having been branched into the polarizer 2104, the first polarizer (polarizer-1) 2104a extracts the horizontally-polarized wave H (Step S2206a), and the second polarizer (polarizer-2) 2104b extracts the vertically-polarized wave V (Step S2206b). The second photodetector (PD-2) 2105b photoelectrically converts the horizontally-polarized wave light intensity $(HI+HQ)^2$ (Step S2204b), and the ADC 2106 converts horizontally-polarized wave light intensity $(HI+HQ)^2$ into a digital signal (Step S2205b) and outputs the digital signal to the optical electric field calculation unit 2107.

The third photodetector (PD-3) 2105c vertically-polarized wave photoelectrically converts the light intensity $(VI+VQ)^2$ (Step S2204c), the ADC 2106 converts vertically-polarized wave light intensity $(VI+VQ)^2$ into a digital signal (Step S2205c) and outputs the digital signal to the optical electric field calculation unit 2107.

From the light having been branched to the polarization controller 2103, the polarization controller 2103 converts the linearly-polarized wave into the circularly-polarized wave (Step S2207). From the light after the conversion to the circularly-polarized wave, the third polarizer (polarizer-3) 2104c extracts horizontally-polarized wave (Step S2206c). The fourth photodetector (PD-4) 2105d photoelectrically converts the circularly-polarized wave intensity $(HI+VQ)^2+(VI+HQ)^2$ (Step S2204d). Further, the ADC 2106 converts the circularly-polarized wave intensity $(HI+VQ)^2+(VI+HQ)^2$ into a digital signal (Step S2205d), and outputs the digital signal to the optical electric field calculation unit 2107.

The optical electric field calculation unit 2107 generates data HI, HQ, VI, and VQ in which the light intensity, the horizontally-polarized wave light intensity, the vertically-polarized wave light intensity, the circularly-polarized wave intensity after the digital conversion are synthesized (Step S2208), and outputs the data HI, HQ, VI, and VQ to the physical amount calculation unit 106.

Figure 23:
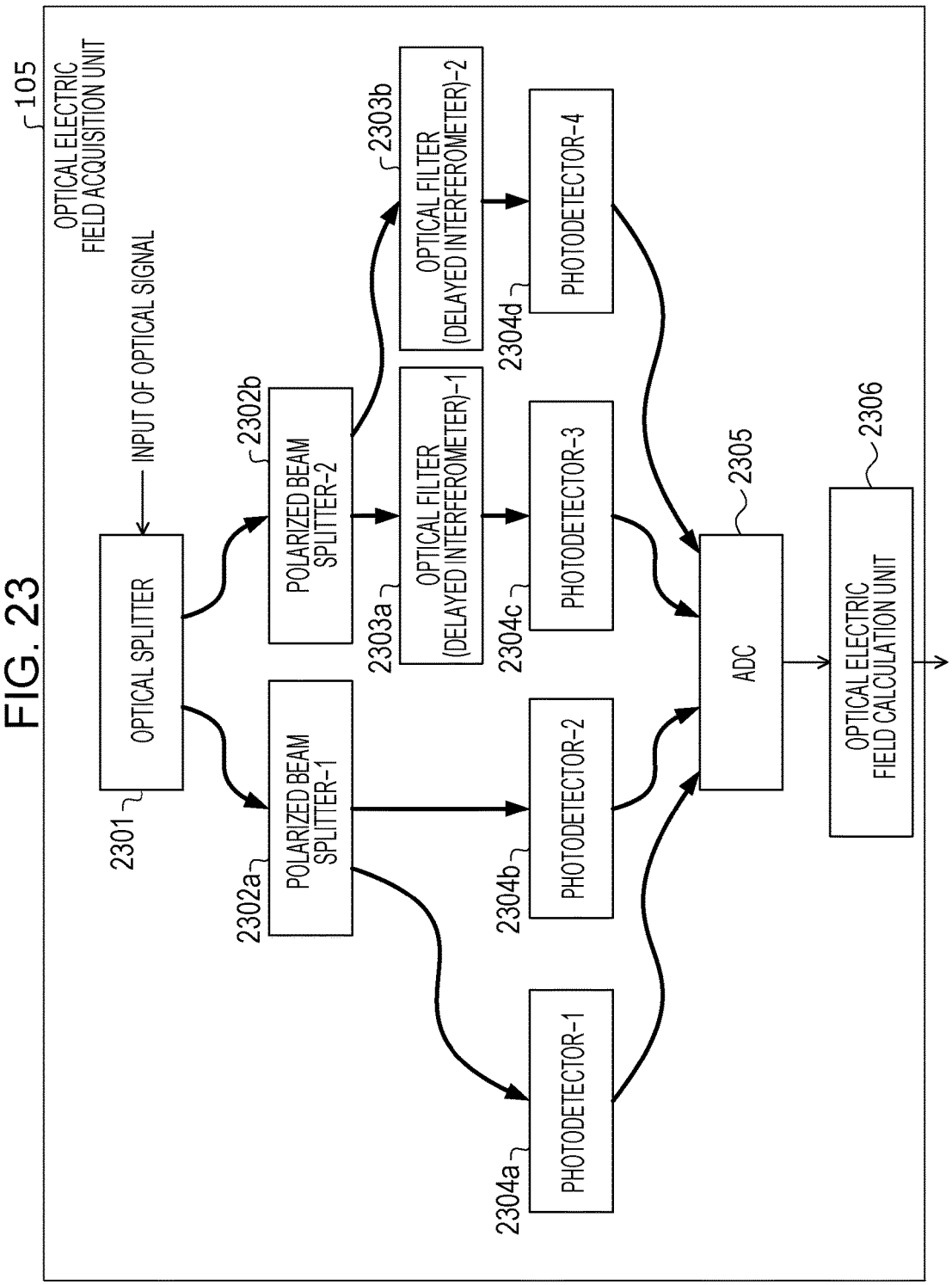
FIG. 23 is a diagram illustrating still another configuration example of the optical electric field acquisition unit of the location-measurement apparatus according to the seventh embodiment.

FIG. 23 is a diagram illustrating still another configuration example of the optical electric field acquisition unit of the location-measurement apparatus according to the seventh embodiment. The optical electric field acquisition unit 105 includes an optical splitter 2301, polarized beam splitters 2302, optical filters 2303, a plurality of photodetectors (PD) 2304, an AD converter (ADC) 2305, and an optical electric field calculation unit 2306.

An optical signal outputted from the optical fiber Fb of the return path is branched by polarization by the optical splitter 2301, and the branched signals are respectively inputted to the two polarized beam splitters 2302a and 2302b, and are photoelectrically converted by the plurality of the photodetectors (PDs) 2304. The light after the polarization separation by the polarized beam splitter 2302b as one of the polarized beam splitters 2302 passes through each optical filter (delayed interferometer) 2303 and then is photoelectrically converted by each PD 2304. Outputs from the respective PDs 2304a to 2304d are digitally converted by the AD converter (ADC) 2305, and then outputted to the optical electric field calculation unit 2306. For example, the functions of the ADC 2305, and the optical electric field calculation unit 2306 may be included in the processing unit 200 (see FIG. 2).

Figure 24:
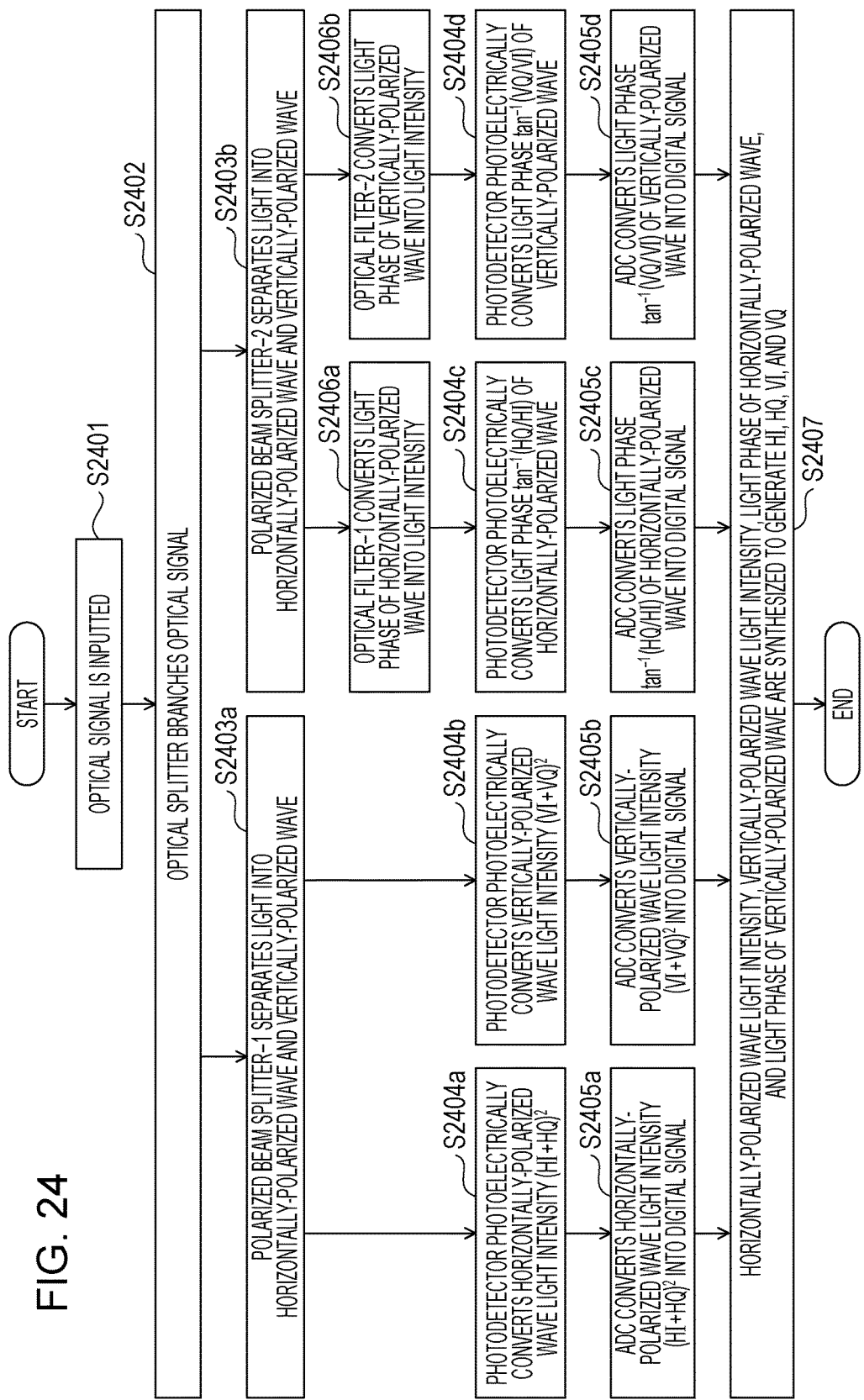
FIG. 24 is a flowchart illustrating an operation content of each unit of the optical electric field acquisition unit in FIG. 23.

FIG. 24 is a flowchart illustrating an operation content of each unit of the optical electric field acquisition unit in FIG. 23. An optical signal received from the optical fiber Fb of the return path is inputted into the optical splitter 2301 (Step S2401). The optical splitter 2101 branches and outputs the inputted optical signal into a plurality of outputs (four in the example of FIG. 23) (Step S2402). The optical signal is branched, and the branched optical signals are outputted to the first polarized beam splitter (polarized beam splitter-1) 2302a and the second polarized beam splitter (polarized beam splitter-2) 2302b.

The first polarized beam splitter 2302a separates the light having been branched into the first polarized beam splitter 2302a into the horizontally-polarized wave H and the vertically-polarized wave V (Step S2403a). As for the horizontally-polarized wave H, the first photodetector (PD-1) 2304a photoelectrically converts the horizontally-polarized wave light intensity $(HI+HQ)^2$ (Step S2404a). Thereafter, the ADC 2305 converts the horizontally-polarized wave light intensity $(HI+HQ)^2$ into a digital signal (Step S2405a), and outputs the digital signal to the optical electric field calculation unit 2306. As for the vertically-polarized wave V, the second photodetector (PD-2) 2304b photoelectrically converts the vertically-polarized wave light intensity $(VI+VQ)^2$ (Step S2404b). Thereafter, the ADC 2305 converts the vertically-polarized wave light intensity $(VI+VQ)^2$ into a digital signal (Step S2405b), and outputs the digital signal to the optical electric field calculation unit 2306.

The second polarized beam splitter 2302b separates the light having been branched into the second polarized beam splitter 2302b into the horizontally-polarized wave H and the vertically-polarized wave V (Step S2403b). As for the horizontally-polarized wave H, the first optical filter (optical filter-1) 2303a converts the light phase of the horizontally-polarized wave into the light intensity (Step S2406a). Thereafter, the third photodetector (PD-3) 2304c photoelectrically convert the horizontally-polarized wave light phase $\tan^{-1}(HQ/HI)$ (Step S2404c). Thereafter, the ADC 2305 converts the horizontally-polarized wave light phase $\tan^{-1}(HQ/HI)$ into a digital signal (Step S2405c), and outputs the digital signal to the optical electric field calculation unit 2306.

As for the vertically-polarized wave V, the second optical filter (optical filter-2) 2303b converts the light phase of the vertically-polarized wave into the light intensity (Step S2406b). Thereafter, the fourth photodetector (PD-4) 2304d photoelectrically converts the vertically-polarized wave light phase $\tan^{-1}(VQ/VI)$ (Step S2404d). Thereafter, the ADC 2305 converts the vertically-polarized wave light phase $\tan^{-1}(VQ/VI)$ into a digital signal (Step S2405d), and outputs the digital signal to the optical electric field calculation unit 2306.

The optical electric field calculation unit 2306 generates data HI, HQ, VI, and VQ in which the horizontally-polarized wave light intensity, the vertically-polarized wave light intensity, the horizontally-polarized wave light phase, and the vertically-polarized wave light phase after the digitally conversion are synthesized (Step S2407), and outputs the data HI, HQ, VI, and VQ to the physical amount calculation unit 106.

With the seventh embodiment explained above, the optical electric field acquisition unit 105 of the location-measurement apparatus 100 coherent receives the optical signal transmitted thought the optical cable F. This may improve the OSNR and the waveform distortion of the received optical signal, and allows the more accurate location measurement based on the accurate data reproduction.

Comparison between Conventional Art and Embodiments

Figure 25:
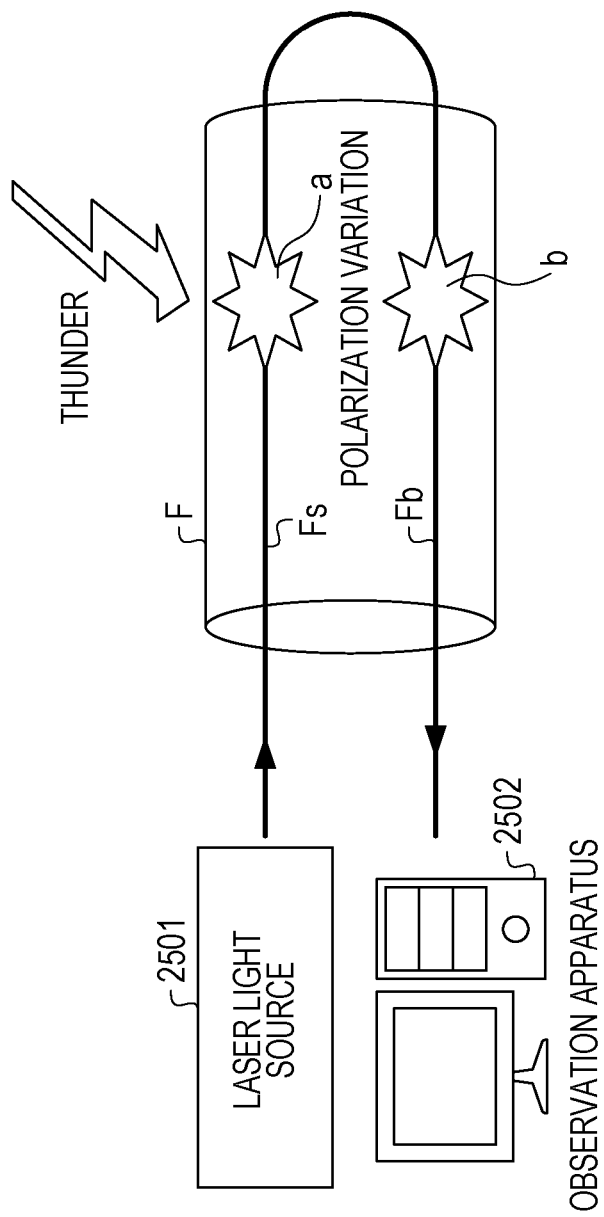
FIG. 25 is a diagram for explaining a measurement method of a light variation location according to the conventional art.

FIG. 25 is a diagram for explaining a measurement method of a light variation location according to the conventional art. In the conventional art, light is inputted from a laser light source 2501 on one terminal of an optical cable F to be measured into an optical fiber Fs of the outward path, and the light in the optical fiber Fs of the outward path is simply turned back into the optical fiber Fb of the return path on the other terminal of the optical cable F. Further, an observation apparatus 2502 that is provided on the one terminal of the optical cable F may observe light variations (polarization variations) of the optical signal at points a and b in optical fibers Fs and Fb of the outward path and the return path Fb, for example, due to a factor such as lightning strike.

Figure 26A:
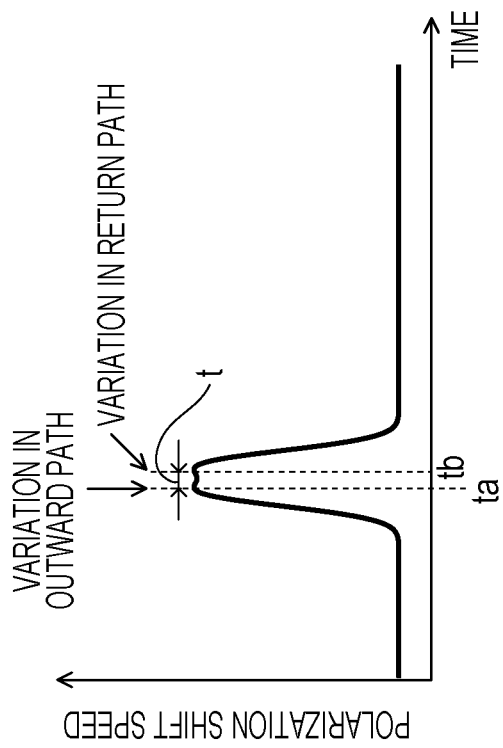
FIGS. 26A and 26B are diagrams each illustrating an observation waveform of the light variation location according to the conventional art.
Figure 26B:
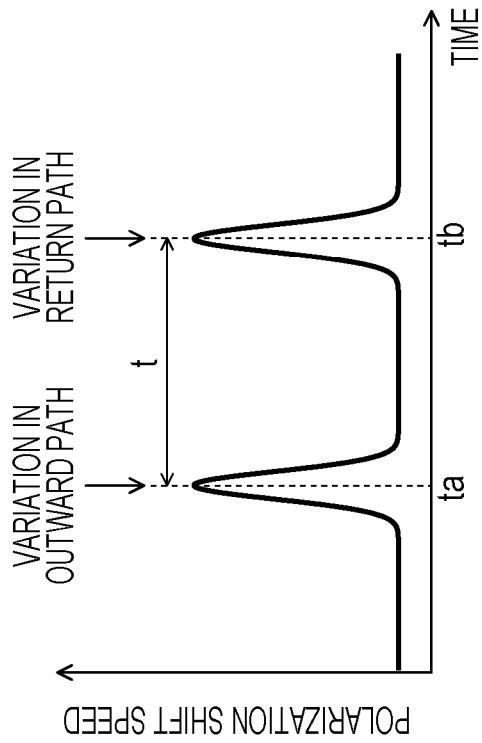

FIGS. 26A and 26B are diagrams each illustrating an observation waveform of the light variation location according to the conventional art. The horizontal axis represents the time, and the longitudinal axis represents the polarization shift speed. As illustrated in FIG. 26A, with the observation apparatus 2502, waveform variations (polarization variations) are respectively generated at a time ta corresponding to the point a in the optical fiber Fs of the outward path and at a time tb corresponding to the point b in the optical fiber Fb of the return path, due to a lightning strike or the like. Further, the observation apparatus 2502 observes the light variation locations based on the time ta and the time tb. A time t is a time difference based on the turning-back of the optical fibers Fs and Fb in the outward path and in the return path.

However, as illustrated in FIG. 26B, when the time ta of the light variation in the outward path and the time tb of the light variation in the return path are overlapped with each other, the related art is unable to separate these light variations in the outward path in the return path because of the same physical amounts in the outward path and the return path, and observe an accurate light variation location. For example, this problem occurs when an overlap between the light variation time in the outward path and the light variation time in the return path has a long period of time. Moreover, when the time ta is close to the time tb, for example, in a case of a lightning strike in the vicinity of the other terminal of the optical fiber F, it is impossible to observe an accurate light variation location.

In contrast, with the embodiments described above, the physical amount of a light variation generated in the optical fiber Fs of the outward path and the physical amount of a light variation generated in the optical fiber Fb of the return path are different physical amounts. Further, the location-measurement apparatus 100 that is provided on one terminal side of the optical cable F may time-resolve these different physical amounts, and may identify a location by correlation. With this, when the time ta of the light variation in the outward path is close to the time tb of the light variation in the return path or the variation time in the outward path is overlapped with the variation time in the return path, it is possible to accurately detect a location of the light variation in the optical fiber Fs of the outward path and a location of the light variation in the optical fiber Fb of the return path (see Part (c) of FIG. 6 and the like). Although the physical amounts in the outward path and in the return path are different, a correlation may be obtained based on the peaks of the waveforms, the light variation time, the shapes of the waveforms, and the like.

Moreover, light corresponding to the first physical amount is inputted from one terminal of the optical fiber, and the first physical amount is converted into the second physical amount by the light modulation converter that is provided on the other terminal of the optical fiber, so that it is possible to measure light variation locations generated on the optical fiber on the one terminal side of the optical fiber. Moreover, it is possible to easily measure light variation locations, with the simple configuration.

Moreover, as for continuous oscillation light caused to enter the optical fiber, any combination of the light intensity, the light phase, the polarization, and the frequency is used as the physical amounts before and after the conversion by being corresponded to the factor of the light variation at the light variation point. With these combinations, it is possible to detect all the light variations of 1. polarization variation, 2. light intensity variation, 3. PDL variation, 4. PMD variation, and 5. frequency variation, and to detect the light variations based on various kinds of factors.

It is also possible to identify a light variation location for a light variation that is instantaneously generated or a light variation without a loss. For example, it is possible to identify light variation locations even in a case where a light variation is instantaneously generated due to a lightning strike or the like to predetermined locations of the optical cable (in the outward path and in the return path of the optical fiber) as a factor and in a case where instantaneous of continuous light variation is generated due to the oscillation or the variation in the electromagnetic field as a factor. In addition, it is also possible to identify the light variation locations due to the PDL variation, the PMD variation, and the frequency variation as factors.

Moreover, the type of the optical fiber is not limited to a single-mode fiber, but the embodiments are applicable to a multi-core fiber and a multi-mode fiber. It is also possible to identify a light variation location even in a case where a crosstalk between multi-cores (in the optical fibers of the outward path and of the return path) or a crosstalk between modes of a multi-mode fiber is generated.

In addition, the use of combinations of the polarization multiplexing and the plurality wavelengths of light to be transmitted, the coherent reception of light in the return path, and the like allows more information for detecting a light variation location to be acquired, so that it is also possible to accurately identify a light variation location.

Note that, the method of measuring a light variation location explained in the embodiments may be implemented such that the computer (CPU or the like) of an apparatus discussed (the location-measurement apparatus described above) executes a control program prepared in advance. The control program is recorded on a computer-readable recording medium such as a magnetic disk, an optical disk, a Universal Serial Bus (USB), or a flash memory, and is executed such that the computer reads control program from the recording medium. Moreover, the control program may be distributed via a network such as the Internet.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A location-measurement apparatus that is disposed on one terminal of an optical transmission line, the location-measurement apparatus comprising:
    a light source that causes continuous oscillation light to enter one terminal of the optical transmission line, the continuous oscillation light being to propagate a light variation of a first physical amount generated on the optical transmission line to another terminal of the optical transmission line;
    a photodetector that detects, on the one terminal of the optical transmission line, light turned back from a light modulation converter provided on the another terminal of the optical transmission line, wherein the light modulation converter obtains the turned-back light by converting the light variation of the first physical amount into a light variation of a second physical amount; and
    a processor that calculates a light-variation location generated on the optical transmission line by comparing time variations in the light variation of the first physical amount and the light variation of the second physical amount in the light detected by the photodetector.

2. The location-measurement apparatus according to claim 1, wherein the processor obtains a cross-correlation between the time variations of the first physical amount and the second physical amount in the detected light, and calculates the light-variation location based on a time difference with a highest correlation between the time variations of the first physical amount and the second physical amount.

3. The location-measurement apparatus according to claim 1 further comprising an optical element that extracts the first physical amount and the second physical amount, wherein
    the first physical amount is a light intensity of the light, and the second physical amount is any one of a light phase, polarization, and a frequency.

4. The location-measurement apparatus according to claim 3, wherein
    the light source polarization-multiplexes light having mutually orthogonal polarization components and outputs the light to the optical transmission line,
    the optical element extracts the light having the orthogonal polarization components, and
    the processor calculates the light-variation location based on the orthogonal polarization components of the light.

5. The location-measurement apparatus according to claim 3, wherein
    the light source polarization-multiplexes light having mutually orthogonal polarization components with different wavelengths and outputs the light to the optical transmission line,
    the optical element extracts the light having the orthogonal polarization components with different frequencies, and
    the processor calculates the light-variation location based on the orthogonal polarization components of the light.

6. The location-measurement apparatus according to claim 3, wherein the optical element is an optical hybrid that multiplexes the detected light with reference light to extract a vertically-polarized wave in-phase component, a vertically-polarized wave orthogonal phase component, a horizontally-polarized wave in-phase component, and a horizontally-polarized wave orthogonal phase component, and outputs the components to the photodetector.

7. The location-measurement apparatus according to claim 1, further comprising a light modulator that adds a pilot signal of one of light variations of a light intensity, a light phase, polarization, and a frequency to light from the light source, and stabilizes the light, wherein the pilot signal serves as a location reference when the time variation is calculated.

8. The location-measurement apparatus according to claim 1, wherein the processor adds a predetermined delay amount to the second physical amount of the detected light, and identifies the light-variation location based on a delay amount with a highest correlation between the time variations of the first physical amount and the second physical amount.

9. The location-measurement apparatus according to claim 8, wherein the processor identifies the light-variation location with the highest correlation between the time variations of the first physical amount and the second physical amount, based on the pilot signal, within a range of a cable length of the optical transmission line.

10. The location-measurement apparatus according to claim 1, wherein
    the optical transmission line that is coupled to one terminal of the apparatus includes an optical fiber of an outward path and an optical fiber of a return path,
    the optical fiber of the outward path transmits light of the light variation of the first physical amount from the one terminal to another terminal, and
    the optical fiber of the return path turns back and transmits light of the light variation of the second physical amount after the conversion by the light modulation converter, and the light of the light variation of the first physical amount, from the another terminal to the one terminal.

11. A light modulation converter that faces a measurement apparatus disposed on one terminal of an optical transmission line and is disposed on another terminal of the optical transmission line, wherein
    the measurement apparatus disposed on the one terminal of the optical transmission line includes:
    a light source that causes continuous oscillation light to enter the one terminal of the optical transmission line, wherein the continuous oscillation light is to propagate a light variation of a first physical amount generated on the optical transmission line to the another terminal of the optical transmission line;
    a photodetector that detects, on the one terminal of the optical transmission line, light turned back from a light modulation converter provided on the another terminal of the optical transmission line, wherein the light modulation converter obtains the turned-back light by converting the light variation of the first physical amount into a light variation of a second physical amount; and
    a processor, and
    the processor calculates a light-variation location generated on the optical transmission line by comparing time variations in the light variation of the first physical amount and the light variation of the second physical amount in the light detected by the photodetector, and
    the light modulation converter comprises an optical element that converts the light variation of the continuous oscillation light with the first physical amount transmitted from the measurement apparatus via the one terminal of the optical transmission line into the light variation of the second physical amount.

12. The light modulation converter according to claim 11, wherein the optical element converts a light intensity of the first physical amount into any one of a light phase, polarization, and a frequency, as the second physical amount.

13. The light modulation converter according to claim 11, further comprising a light modulator that adds a pilot signal of any one of light variations of the light intensity, the light phase, the polarization, and the frequency to the light, and stabilizes the light, wherein the pilot signal serves as a location reference when the time variation is calculated.

14. The light modulation converter according to claim 11, wherein the optical element polarization separates light having mutually orthogonal polarization components included in the transmitted light, and then converts the light variation of the first physical amount into the variation of the second physical amount.

15. The light modulation converter according to claim 11, wherein the light modulation converter demultiplexes a plurality of wavelengths included in the transmitted light, and then converts the light variation of the first physical amount to the light variation of the second physical amount.

16. A measurement system comprising:
a measurement apparatus that is disposed on one terminal of an optical transmission line; and
a light modulation converter that is disposed on another terminal of the optical transmission line, wherein
the measurement apparatus includes:
a light source that causes continuous oscillation light to enter the one terminal of the optical transmission line, wherein the continuous oscillation light is to propagate a light variation of a first physical amount generated on the optical transmission line to the another terminal of the optical transmission line;
a photodetector that detects, on the one terminal of the optical transmission line, light turned back from a light modulation converter, wherein the light modulation converter obtains the turned-back light by converting the light variation of the first physical amount into a light variation of a second physical amount; and
a processor that calculates a light-variation location generated on the optical transmission line by comparing time variations in the light variation of the first physical amount and the light variation of the second physical amount in the light detected by the photodetector, and the light modulation converter comprises an optical element that converts the light variation of the continuous oscillation light with the first physical amount transmitted from the measurement apparatus via the one terminal of the optical transmission line into the light variation of the second physical amount.

17. The measurement system according to claim 16, wherein
the optical element of the light modulation converter converts a light intensity of the first physical amount into any one of a light phase, polarization, and a frequency, as the second physical amount, and
the measurement apparatus includes an optical element that extracts the first physical amount and the second physical amount before and after the conversion by the light modulation converter.

18. The measurement system according to claim 16, wherein the processor of the measurement apparatus obtains a cross-correlation between the time variations of the first physical amount and the second physical amount in the detected light, and calculates the light-variation location based on a time difference with a high correlation between the time variations of the first physical amount and the second physical amount.

19. A measurement method comprising:
causing continuous oscillation light to enter one terminal of an optical transmission line, wherein the continuous oscillation light is to propagate a light variation of a first physical amount generated on the optical transmission line to another terminal of the optical transmission line;
on the one terminal of the optical transmission line, detecting light turned back from the another terminal of the optical transmission line, the turned-back light obtained by converting the light variation of the first physical amount into a light variation of a second physical amount on the another terminal of the optical transmission line; and
obtaining a light-variation location generated on the optical transmission line by comparing time variations in the light variation of the first physical amount and the light variation of the second physical amount in the detected light.

* * * * *